(12) United States Patent
Lin et al.

(10) Patent No.: US 8,159,274 B2
(45) Date of Patent: Apr. 17, 2012

(54) SIGNALING WITH SUPERIMPOSED CLOCK AND DATA SIGNALS

(75) Inventors: Qi Lin, Mountain View, CA (US); Jaeha Kim, Los Altos, CA (US); Brian S. Leibowitz, San Francisco, CA (US); Jared L. Zerbe, Woodside, CA (US); Jihong Ren, Sunnyvale, CA (US)

(73) Assignee: Rambus Inc., Sunnyvale, CA (US)

( * ) Notice: Subject to any disclaimer, the term of this patent is extended or adjusted under 35 U.S.C. 154(b) by 74 days.

(21) Appl. No.: 12/739,936

(22) PCT Filed: Oct. 28, 2008

(86) PCT No.: PCT/US2008/081477
§ 371 (c)(1),
(2), (4) Date: Apr. 26, 2010

(87) PCT Pub. No.: WO2009/058789
PCT Pub. Date: May 7, 2009

(65) Prior Publication Data
US 2011/0142112 A1    Jun. 16, 2011

Related U.S. Application Data

(60) Provisional application No. 60/983,901, filed on Oct. 30, 2007.

(51) Int. Cl.
*H03B 1/00* (2006.01)
*H03K 3/00* (2006.01)
(52) U.S. Cl. ............... 327/108; 327/110; 327/112
(58) Field of Classification Search ............ 327/108, 327/110, 112
See application file for complete search history.

(56) References Cited

U.S. PATENT DOCUMENTS

| | | | |
|---|---|---|---|
| 4,201,942 A | 5/1980 | Downer | 375/17 |
| 5,600,634 A | 2/1997 | Satoh et al. | 370/294 |
| 6,115,430 A | 9/2000 | Tanaka et al. | 375/318 |
| 6,137,332 A | 10/2000 | Inoue et al. | 327/256 |

(Continued)

FOREIGN PATENT DOCUMENTS

JP    2002-204272 A    7/2002

(Continued)

OTHER PUBLICATIONS

International Search Report and Written Opinion issued in PCT/US2008/081477, Mar. 27, 2009, 9 pages by ISA/KR.

(Continued)

*Primary Examiner* — Lincoln Donovan
*Assistant Examiner* — John Poos
(74) *Attorney, Agent, or Firm* — Morgan, Lewis & Bockius LLP

(57) ABSTRACT

A data transmission circuit includes a clock driver to obtain a clock signal having a first rate and to drive the clock signal onto one or more transmission lines. The data transmission circuit also includes a timing circuit to obtain the clock signal and to generate a symbol clock having a second rate. The first rate is a multiple of the second rate, wherein the multiple is greater than one. The data transmission circuit further includes a data driver synchronized to the symbol clock. The data driver obtains a data signal and drives the data signal onto the one or more transmission lines at the second rate. The data signal and the clock signal are driven onto the one or more transmission lines simultaneously.

26 Claims, 22 Drawing Sheets

U.S. PATENT DOCUMENTS

| | | | |
|---|---|---|---|
| 6,492,984 B2 | 12/2002 | Martin | 345/213 |
| 7,158,593 B2 | 1/2007 | Kim et al. | 375/354 |
| 7,508,881 B2 | 3/2009 | Choi et al. | 375/288 |
| 2004/0239374 A1 | 12/2004 | Hori | 327/65 |
| 2006/0188043 A1* | 8/2006 | Zerbe et al. | 375/346 |

FOREIGN PATENT DOCUMENTS

WO     WO 00/22499 A2    4/2000

OTHER PUBLICATIONS

International Search Report and Written Opinion issued in PCT/US2008/081478, Jan. 8, 2009, 10 pages by ISA/EP.

Gabara T., Phantom Mode Signaling in VLSI Systems, Advanced Research in VLSI, 2001. Proceedings of ARVLSI 2001 Conference, Mar. 14-16, 2001, Piscataway, NJ, pp. 88-100.

* cited by examiner

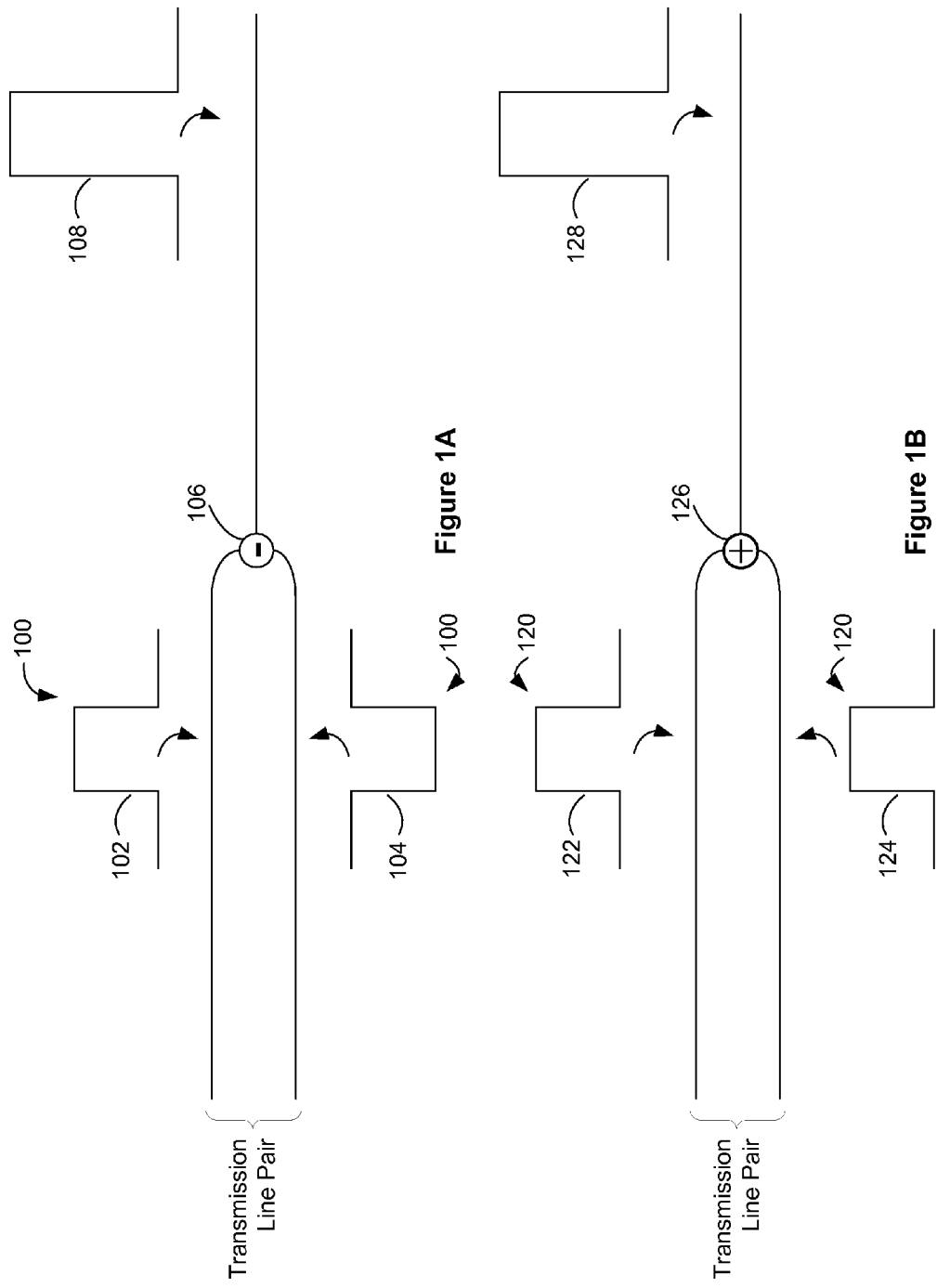

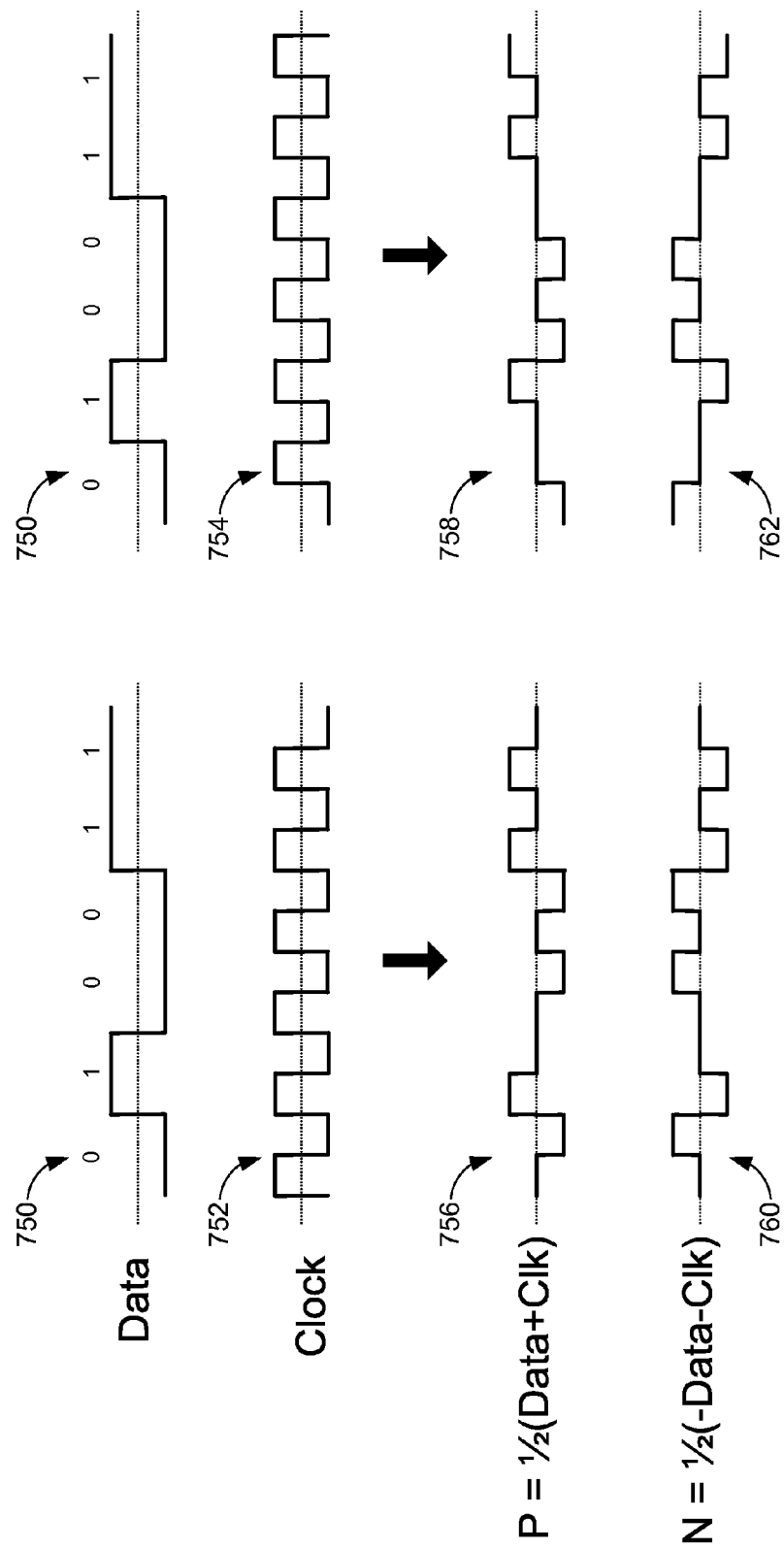

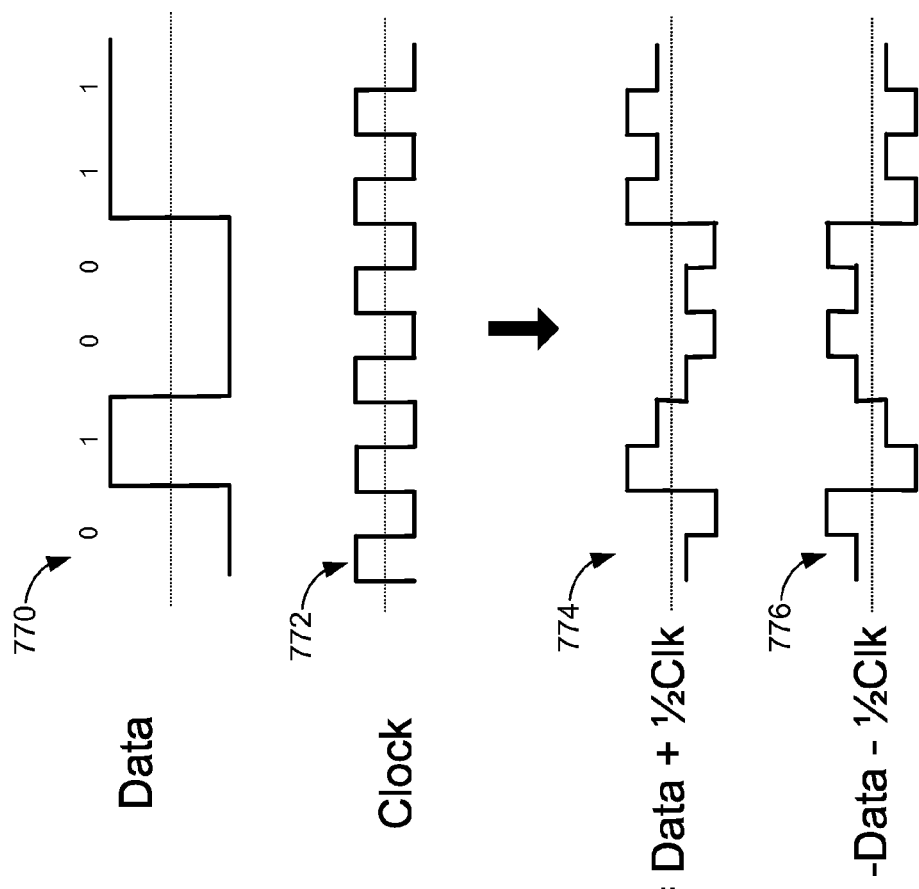

ial Stage Appli-
SIGNALING WITH SUPERIMPOSED CLOCK AND DATA SIGNALS

CROSS REFERENCE TO RELATED APPLICATIONS

This Application is a United States National Stage Application filed under 35 U.S.C. §371 of PCT Patent Application Serial No. PCT/US2008/081477 filed on Oct. 28, 2008, which claims the benefit of and priority to United States Provisional Patent Application Ser. No. 60/983,901 filed on Oct. 30, 2007, the disclosures of all of which are hereby incorporated by reference in their entirety.

TECHNICAL FIELD

The disclosed embodiments relate generally to data communications, and more particularly, to high speed electronic signaling within and between integrated circuits.

BACKGROUND

High speed data communications over a communications channel such as a backplane electrical link present significant engineering challenges. For example, edge-based clock and data recovery (CDR) limits receiver performance.

BRIEF DESCRIPTION OF THE DRAWINGS

FIG. 1A is a schematic illustration of differential-mode signaling in accordance with some embodiments.

FIG. 1B is a schematic illustration of common-mode signaling in accordance with some embodiments.

FIGS. 7D and 7E illustrate waveforms associated with simultaneously transmitting data and clock signals over a channel in accordance with some embodiments.

Like reference numerals refer to corresponding parts throughout the drawings.

DESCRIPTION OF EMBODIMENTS

Figure 1C:
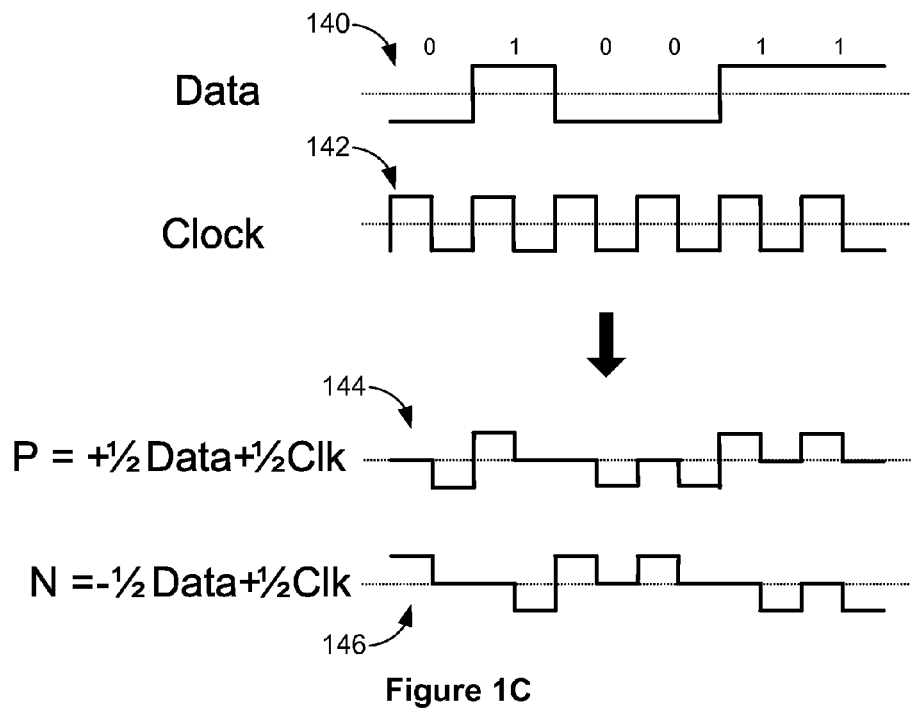
FIGS. 1C and 1D illustrate waveforms associated with simultaneously transmitting differential-mode 'Data' and common-mode 'Clock' signals over a pair of transmission lines in accordance with some embodiments.

In some embodiments, a data transmission circuit includes a clock driver that obtains a clock signal having a first frequency and drives the clock signal onto one or more transmission lines. The data transmission circuit also includes a timing circuit to obtain the clock signal and to generate a symbol clock having a second frequency. The first frequency is a multiple of the second frequency, wherein the multiple is greater than one. The data transmission circuit further includes a data driver synchronized to the symbol clock. The data driver obtains a data signal and drives the data signal onto the one or more transmission lines at a symbol rate corresponding to the second frequency. The data signal and the clock signal are driven onto the one or more transmission lines simultaneously.

In some embodiments, a data transmission circuit includes a clock driver that obtains a clock signal having a first frequency and drives the clock signal onto one or more transmission lines. The data transmission circuit also includes a timing circuit to obtain the clock signal and to generate a symbol clock having a second frequency. The first frequency is a multiple of the second frequency, wherein the multiple is greater than or equal to one. The data transmission circuit further includes a data driver synchronized to the symbol clock. The data driver obtains a data signal and drives the data signal onto the one or more transmission lines in a non-return-to-zero (NRZ) format at a symbol rate corresponding to the second frequency. The data signal and the clock signal are driven onto the one or more transmission lines simultaneously.

In some embodiments, a data receiver circuit includes an interface coupled to one or more transmission lines. The interface simultaneously receives a data signal and a clock signal superimposed on the data signal. The clock signal has a first frequency. The data receiver circuit also includes a clock extraction circuit, coupled to the interface, to extract the clock signal, and a timing circuit to receive the clock signal and to generate a symbol clock having a second frequency. The first frequency is a multiple of the second frequency, wherein the multiple is greater than or equal to one. The data receiver circuit further includes a sampling circuit to sample the data signal. The sampling circuit is synchronized to the symbol clock.

In some embodiments, a method of transmitting data includes obtaining a clock signal having a first frequency, driving the clock signal onto one or more transmission lines, and generating a symbol clock having a second frequency. The first frequency is a multiple of the second frequency, wherein the multiple is greater than one. The method further includes obtaining a data signal and driving the data signal onto the one or more transmission lines at a symbol rate corresponding to the second frequency. The data signal and the clock signal are driven onto the one or more transmission lines simultaneously.

In some embodiments, a method of transmitting data includes obtaining a clock signal having a first frequency, driving the clock signal onto one or more transmission lines, and generating a symbol clock having a second frequency. The first frequency is a multiple of the second frequency, wherein the multiple is greater than or equal to one. The method further includes obtaining a data signal and driving the data signal onto the one or more transmission lines in a non-return-to-zero (NRZ) format at a symbol rate corresponding to the second frequency. The data signal and the clock signal are driven onto the one or more transmission lines simultaneously.

In some embodiments, a method of receiving data includes simultaneously receiving a data signal and a clock signal superimposed on the data signal, wherein the clock signal has a first frequency. The method also includes extracting the clock signal and generating a symbol clock having a second frequency. The first frequency is a multiple of the second frequency, wherein the multiple is greater than or equal to one. The method further includes sampling the data signal, wherein the sampling is synchronized to the symbol clock.

In some embodiments, a data transmission circuit includes means for obtaining a clock signal having a first frequency, means for driving the clock signal onto one or more transmission lines, and means for generating a symbol clock having a second frequency. The first frequency is a multiple of the second frequency, wherein the multiple is greater than one. The data transmission circuit also includes means for obtaining a data signal and means for driving the data signal onto the one or more transmission lines at a symbol rate corresponding to the second frequency. The data signal and the clock signal are driven onto the one or more transmission lines simultaneously.

In some embodiments, a data transmission circuit includes means for obtaining a clock signal having a first frequency, means for driving the clock signal onto one or more transmission lines, and means for generating a symbol clock having a second frequency. The first frequency is a multiple of the second frequency, wherein the multiple is greater than or equal to one. The data transmission circuit also includes means for obtaining a data signal and means for driving the data signal onto the one or more transmission lines in a non-return-to-zero (NRZ) format at a symbol rate corresponding to the second frequency. The data signal and the clock signal are driven onto the one or more transmission lines simultaneously.

In some embodiments, a data receiver circuit includes means for simultaneously receiving a data signal and a clock signal superimposed on the data signal, wherein the clock signal has a first frequency. The data receiver circuit also includes means for extracting the clock signal and means for generating a symbol clock having a second frequency. The first frequency is a multiple of the second frequency, wherein the multiple is greater than or equal to one. The data receiver circuit further includes means for sampling the data signal, wherein the means for sampling the data signal is synchronized to the symbol clock.

In some embodiments, a computer readable medium contains circuit description data that, when operated on by a circuit compiler program being executed by a processor, synthesizes a data transmission circuit that includes a clock driver. The clock driver obtains a clock signal having a first frequency and drives the clock signal onto one or more transmission lines. The data transmission circuit also includes a timing circuit to obtain the clock signal and to generate a symbol clock having a second frequency. The first frequency is a multiple of the second frequency, wherein the multiple is greater than one. The data transmission circuit further includes a data driver synchronized to the symbol clock. The data driver obtains a data signal and drives the data signal onto the one or more transmission lines at a symbol rate corresponding to the second frequency. The data signal and the clock signal are driven onto the one or more transmission lines simultaneously.

In some embodiments, a computer readable medium contains circuit description data that, when operated on by a circuit compiler program being executed by a processor, synthesizes a data transmission circuit that includes a clock driver. The clock driver obtains a clock signal having a first frequency and drives the clock signal onto one or more transmission lines. The data transmission circuit also includes a timing circuit to obtain the clock signal and to generate a symbol clock having a second frequency. The first frequency is a multiple of the second frequency, wherein the multiple is greater than or equal to one. The data transmission circuit further includes a data driver synchronized to the symbol clock. The data driver obtains a data signal and drives the data signal onto the one or more transmission lines in a non-return-to-zero (NRZ) format at a symbol rate corresponding to the second frequency. The data signal and the clock signal are driven onto the one or more transmission lines simultaneously.

In some embodiments, a computer readable medium contains circuit description data that, when operated on by a circuit compiler program being executed by a processor, synthesizes a data receiver circuit that includes an interface coupled to one or more transmission lines. The interface simultaneously receives a data signal and a clock signal superimposed on the data signal. The clock signal has a first frequency. The data receiver circuit also includes a clock extraction circuit, coupled to the interface, to extract the clock signal, and a timing circuit to receive the clock signal and to generate a symbol clock having a second frequency. The first frequency is a multiple of the second frequency, wherein the multiple is greater than or equal to one. The data receiver circuit further includes a sampling circuit to sample the data signal. The sampling circuit is synchronized to the symbol clock.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Figure 7A:
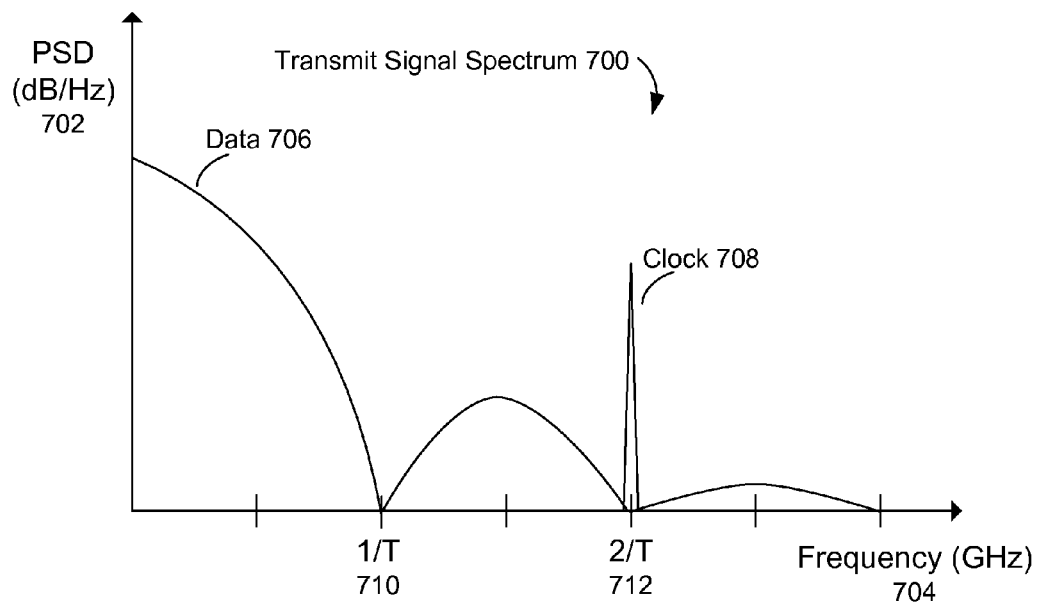
FIGS. 7A-7C are prophetic transmit signal spectrums of a data signal and a clock signal simultaneously transmitted over a channel in accordance with some embodiments.
Figure 7B:
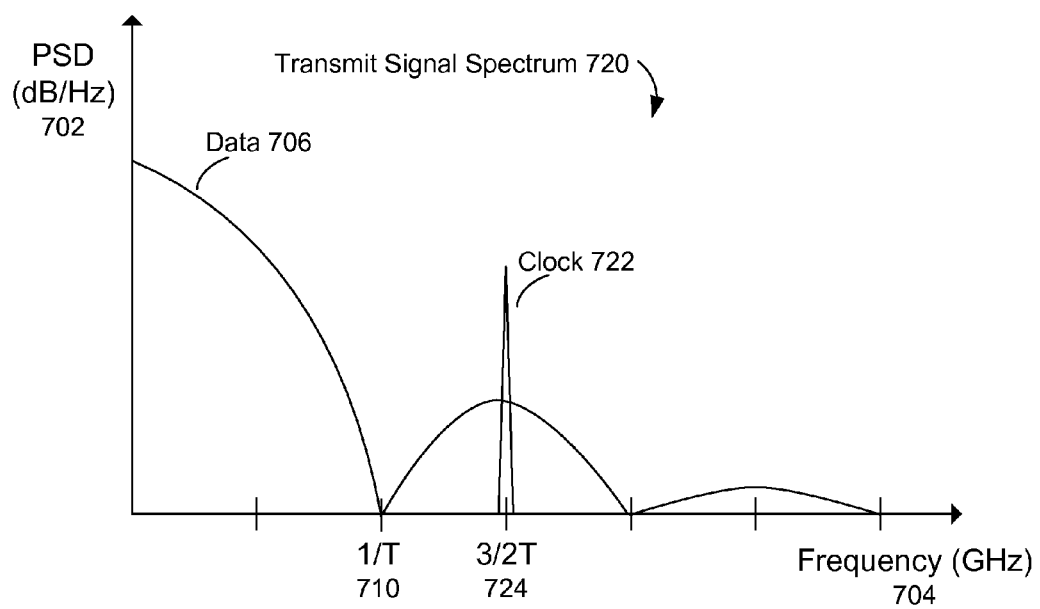

Multiple signals, such as a data signal and a clock signal, may be transmitted simultaneously over a channel, such as a transmission line or a pair of transmission lines. In some embodiments, a first signal is transmitted differentially over a pair of transmission lines and a second signal is simultaneously transmitted over the pair of transmission lines in a common mode. For example, a clock signal is transmitted in a common mode and a data signal is simultaneously transmitted differentially, where the data signal has a symbol rate corresponding to the frequency of the clock signal. Differential and common-mode signaling are discussed further with regard to FIGS. 1A and 1B, below. In some embodiments, a first signal is transmitted over a channel and a second signal is simultaneously transmitted over the channel at a frequency outside the frequency band of the first signal. For example, a clock signal is transmitted at a frequency greater than a symbol rate of a simultaneously transmitted data signal, as shown in FIGS. 7A and 7B, below.

In differential signaling, a first transmission line in a pair of transmission lines carries a signal and a second transmission line in the pair carries the inverse of the signal. The inverse of the signal has an equal magnitude and an opposite polarity to the signal. The sum of the voltages on the two transmission lines corresponding to the two signals is constant. A signal transmitted using differential signaling is herein referred to as a differential-mode signal.

FIG. 1A is a schematic illustration of differential-mode signaling in accordance with some embodiments. A differential-mode signal 100 includes a first signal 102 transmitted on a first transmission line and a second signal 104 transmitted on a second transmission line. The second signal 104 has an equal magnitude (or a substantially equal magnitude if the circuits producing the two signals are not perfectly matched) and an opposite polarity to the first signal 102. At the end of the transmission lines, a combiner 106 extracts the transmitted signal by taking the difference of the first signal 102 and the second signal 104, producing an extracted signal 108.

In some embodiments, a pair of transmission lines that transmits a differential mode signal simultaneously transmits a common-mode signal. In common-mode signaling, the same signal is transmitted over both transmission lines in the pair.

FIG. 1B is a schematic illustration of common-mode signaling in accordance with some embodiments. A common-mode signal 120 includes a first signal 122 transmitted on a first transmission line and a second signal 124 transmitted on a second transmission line. The first signal 122 and the second signal 124 have equal magnitudes (or substantially equal magnitudes if the circuits producing the two signals are not perfectly matched) and equal polarities (i.e., the same polarity). At the end of the transmission lines, a combiner 126 extracts the transmitted signal by summing the first signal 122 and the second signal 124, producing an extracted signal 128.

Differential-mode and common-mode signals transmitted simultaneously over a pair of transmission lines can be independently extracted by a receiver. Taking the difference of the voltages on the two transmission lines (e.g., with a combiner 106) will cancel out a common-mode signal and extract a differential-mode signal. Summing the voltages on the two transmission lines (e.g., with a combiner 126) will cancel out a differential-mode signal and extract a common-mode signal.

In some embodiments, a pair of transmission lines that transmit differential-mode and/or common-mode signals are implemented as two or more traces on one or more printed circuit boards (e.g., a backplane link), two or more signal paths on a semiconductor device, or a channel in a network (e.g., an Ethernet network).

Figure 1D:
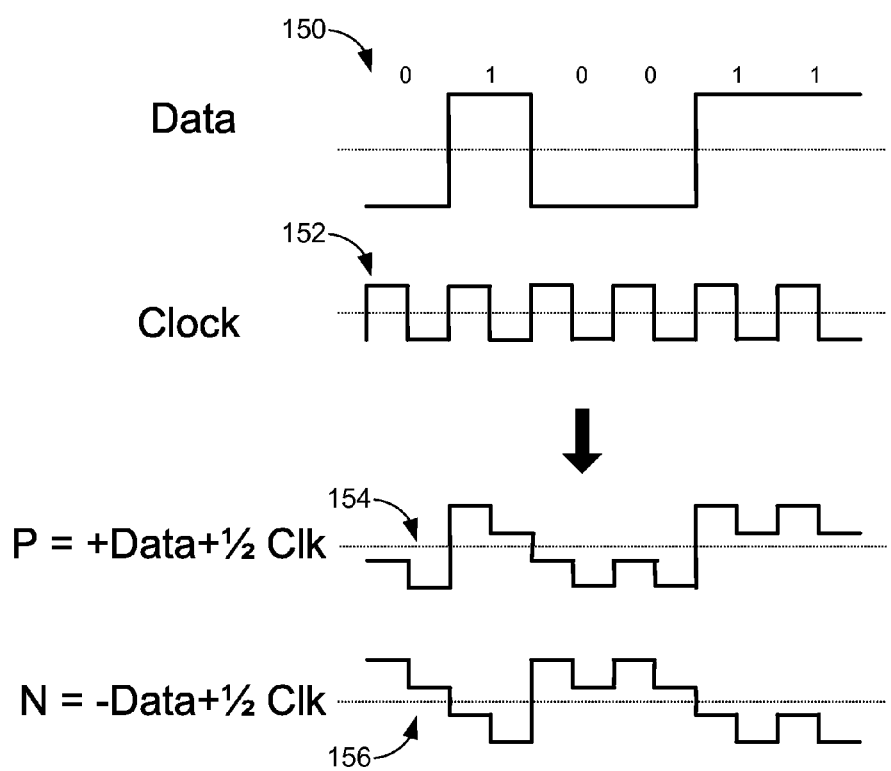

FIGS. 1C and 1D illustrate waveforms associated with simultaneously transmitting differential-mode and common-mode signals over a pair of transmission lines in accordance with some embodiments. In these examples, a data signal is transmitted differentially and a clock signal is transmitted in a common-mode; some implementations may choose other different signaling modes for clock and data separation, such as sending data in common mode and clock in differential mode. In FIG. 1C, a data waveform 140 corresponding to a particular polarity of a differential-mode data signal and a clock waveform 142 corresponding to a common-mode clock signal have equal amplitudes. The differential-mode data signal and common-mode clock signal are simultaneously driven onto the pair of transmission lines, resulting in a waveform 144 on the first transmission line and a waveform 146 on the second transmission line. A receiver can recover the clock and data waveforms 140 and 142, as described below.

In FIG. 1D, a data waveform 150 corresponding to a particular polarity of a differential-mode data signal has twice the amplitude of a clock waveform 152 corresponding to a common-mode clock signal. The differential-mode data signal and common-mode clock signal are simultaneously driven onto the pair of transmission lines, resulting in a waveform 154 on the first transmission line and a waveform 156 on the second transmission line. (Waveforms 154 and 156 are not drawn to scale with respect to waveforms 150 and 152). In FIGS. 1C and 1D data transitions are phase-aligned to rising clock edges. Generally, however, data transitions and rising clock edges may be skewed. FIGS. 1C and 1D are examples of different amplitude ratios between transmitted differential and common-mode signals. It follows from examples 1C and 1D that the ratio of the differential and common-mode signal may be selected to have some fractional amplitude relationship with the possibility of either signal being the larger, as conditions dictate.

Figure 2A:
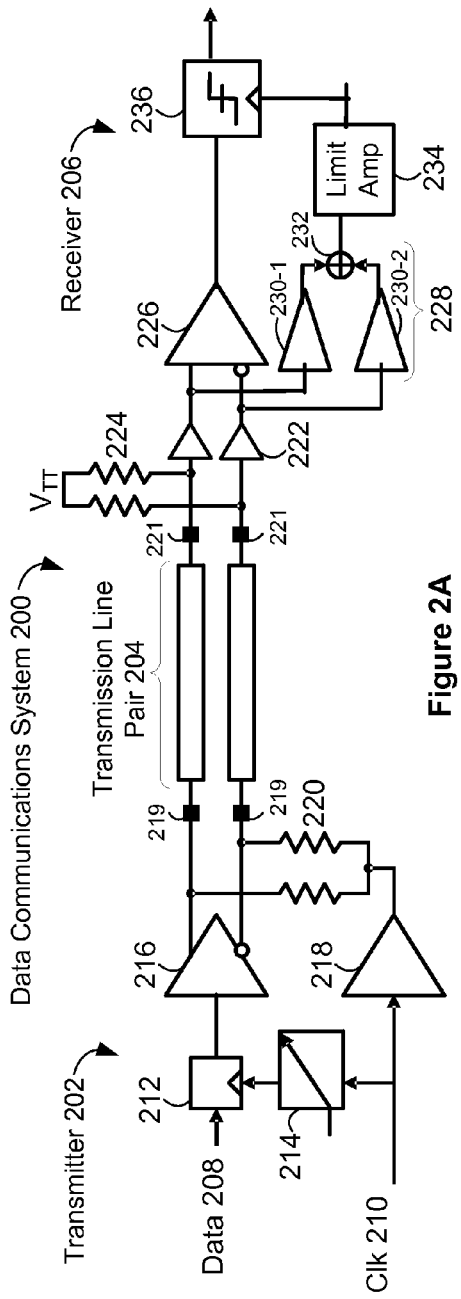
FIGS. 2A and 2B are block diagrams of a data communications system in accordance with some embodiments.

FIG. 2A is a block diagram of a data communications system 200 in accordance with some embodiments. The data communications system 200 includes a transmitter 202, a pair of transmission lines 204, and a receiver 206.

The transmitter 202 receives for transmission a data signal 208 and a clock signal 210. A clock driver 218 drives the clock signal via interfaces 219 onto the pair of transmission lines 204 in a common mode. Simultaneously, a data driver 216 drives the data signal via interfaces 219 onto the pair of transmission lines 204 in a differential mode with a symbol rate corresponding to the clock signal frequency. In some embodiments, the clock driver 218 and/or the data driver 216 are line drivers, such as digital-to-analog converters (DACs) (e.g., zero-order hold DACs). In some embodiments, the path between the clock driver 218 and the pair of transmission lines 204 includes termination resistors 220. In some embodiments, the interfaces 219 include pins, balls, or other electrical contacts on a semiconductor package.

In some embodiments, a phase adjuster 214 receives the clock signal 210 and provides a phase-adjusted clock signal to a data retimer 212. The data retimer 212 receives the data signal 208 and provides the data signal to the data driver 216 at a symbol rate corresponding to the clock signal frequency. In some embodiments, the phase adjuster 214 is a phase interpolator. In some embodiments, the phase adjuster 214 is a phase-locked loop (PLL), a delay-locked loop (DLL), a voltage controlled delay line (VCDL), or other timing adjustment circuit.

The receiver 206 receives via interfaces 221 a transmission signal that includes the differential-mode data signal and the common-mode clock signal. In some embodiments, the interfaces 221 include pins, balls, or other electrical contacts on a semiconductor package. A differential mode extraction circuit 226 extracts the differential-mode data signal from the received transmission signal. The extracted data signal is provided to a sampling circuit 236 that samples the extracted data signal.

A common mode extraction circuit 228 extracts the common-mode clock signal from the received transmission signal. In some embodiments, the common mode extraction circuit 228 includes buffers 230 and a combiner 232. The extracted clock signal is provided to the sampling circuit 236 via an optional limiting amplifier 234 which can reduce the voltage and timing noise. In some embodiments, the common mode extraction circuit 228 includes a band-pass filter, such as an LC network with a resonant peak substantially centered on the clock signal frequency.

Figure 2B:
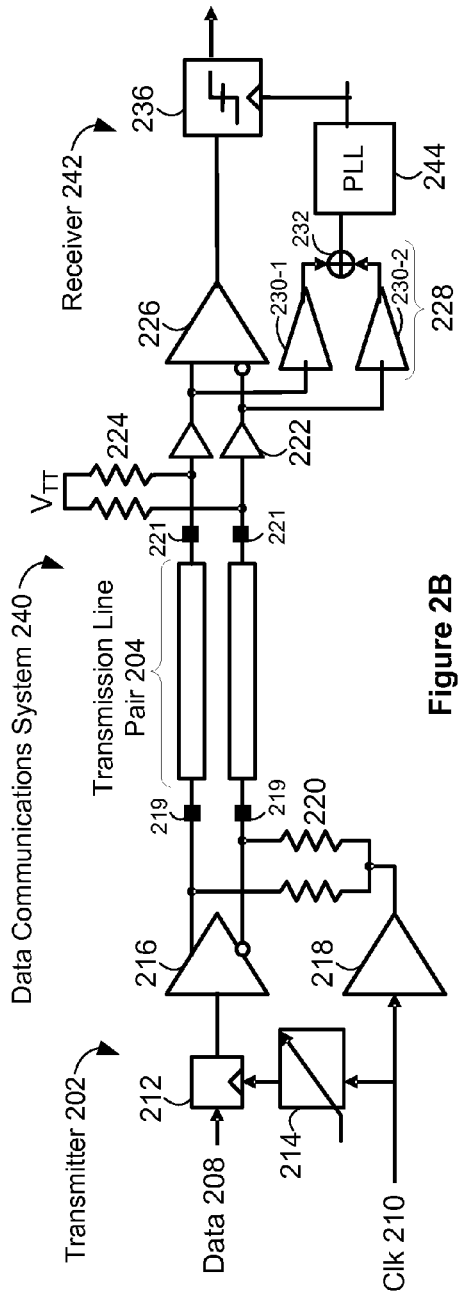

In some embodiments, a limit amplifier 234, also referred to as a clipping amplifier, amplifies the extracted clock signal and provides the amplified clock signal to the sampling circuit 236. In some embodiments a timing circuit receives the extracted clock signal and provides a clock signal to the sampling circuit 236. In some embodiments, the timing circuit includes a PLL 244 (receiver 242; FIG. 2B) or a DLL (not shown). In some embodiments, the timing circuit includes a phase interpolator (not shown).

In some embodiments, the receiver 206 includes buffers 222 to isolate the receiver circuitry from the pair of transmission lines 204. In some embodiments, termination resistors 224 terminate the pair of transmission lines 204. Each of the termination resistors 224 may be coupled at one end to a termination voltage source $V_{TT}$, and at the other end to a respective transmission line 204.

In some embodiments, a first pair of transmission lines transmits a first common-mode clock signal and a second pair of transmission lines transmits a second common-mode clock signal. The first and second common-mode clock signals have opposite polarities. Thus, taken together, the first and second common-mode clock signals provide a single differential clock signal.

Figure 3:
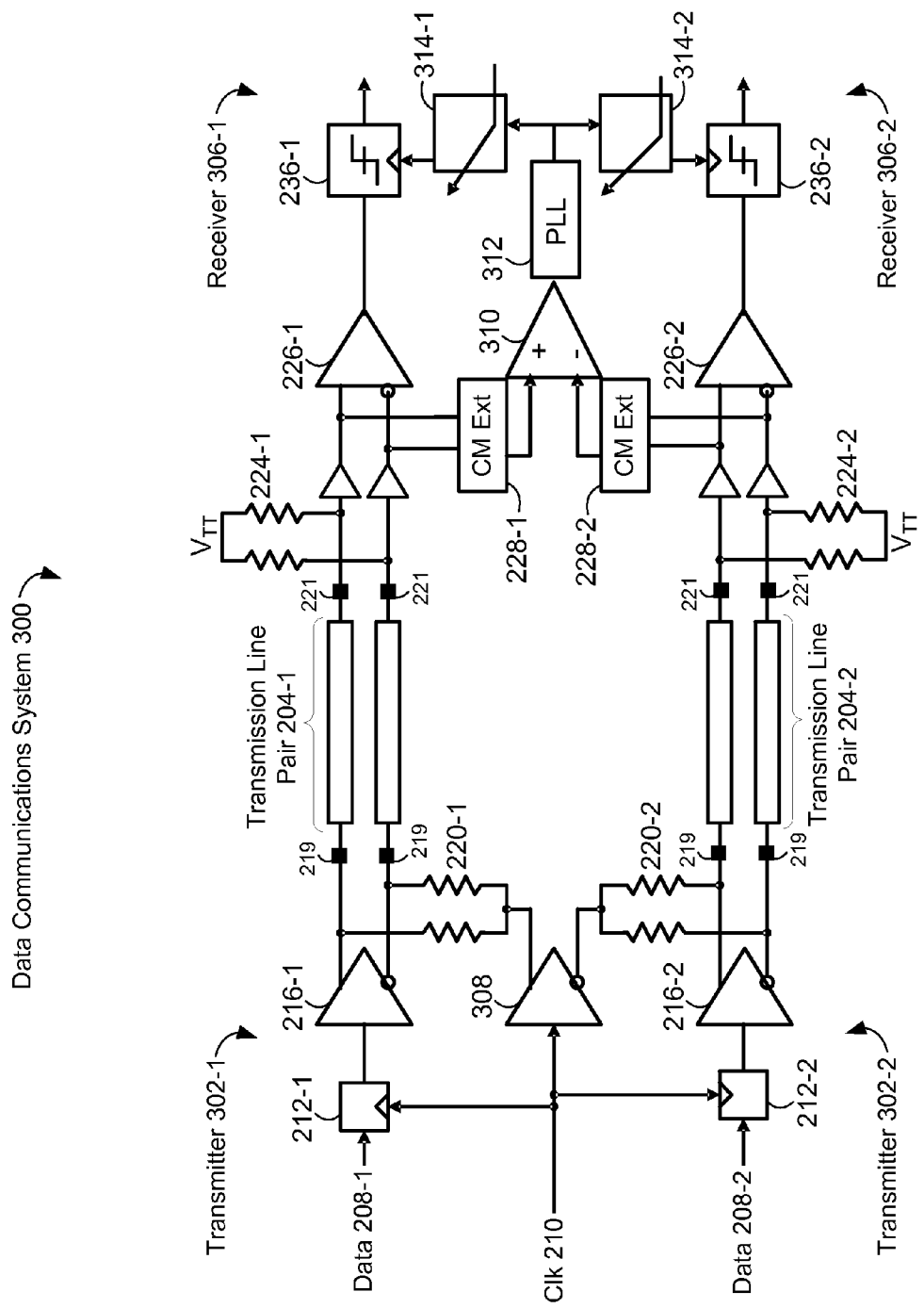
FIG. 3 is a block diagram of a data communications system in accordance with some embodiments.

FIG. 3 is a block diagram of a data communications system 300 in accordance with some embodiments. The data communications system 300 includes two transmitters 302, two pairs of transmission lines 204, and two receivers 306. In some embodiments, the first transmitter 302-1 simultaneously transmits a first differential-mode data signal and a first common-mode output clock signal, and the second transmitter 302-2 simultaneously transmits a second differential-mode data signal and a second common-mode output clock signal. The first and second common-mode clock signals have opposite polarities and thus effectively provide a single differential clock signal to the two receivers 306-1 and 306-2. This reduces the electromagnetic interference (EMI) caused by the transmission of the clock signal.

Each transmitter 302 receives for transmission a respective data signal 208. In some embodiments, the respective data signals 208 are provided to respective data retimers 212, which also receive an input clock signal 210 and which provide the respective data signals 208 to respective data drivers 216 at a symbol rate corresponding to the input clock signal 210 frequency. The data drivers 216 drive the respective data signals 208 onto the respective transmission line pairs 204 at a symbol rate corresponding to the input clock signal 210 frequency.

In some embodiments, a phase adjuster (not shown) adjusts the phase of the clock signal provided to a respective data retimer 212-1 or 212-2.

In some embodiments, the input clock signal 210 is provided to a clock driver 308, which drivers the first common mode output clock signal onto the first pair 204-1 of transmission lines and the second common mode output clock signal onto the second pair 204-2 of transmission lines. In some embodiments, the clock driver 308 includes a phase offset vernier to compensate for skew between the input clock used for data retiming and the clock transmitted by driver 308. In some embodiments, the vernier phase offset is approximately 90 degrees.

Each receiver 306 receives a transmission signal that includes a differential-mode data signal and a common-mode clock signal. Differential mode extraction circuits 226 extract the differential-mode data signals from the transmission signals. The extracted data signals are provided to sampling circuits 236 that sample the extracted data signals.

A common-mode extraction circuit 228 in each receiver extracts the respective common-mode output clock signal from the respective transmission signal. The first and second extracted output clock signals, with opposite polarity, are provided to a combiner 310 that combines the extracted output clock signals into a single sampling clock signal. The sampling circuits 236-1 and 236-2 in the first and second receivers 306-1 and 306-2 are synchronized to the sampling clock signal.

In some embodiments, the combiner 310 provides the sampling clock signal to a timing circuit. The timing circuit receives the sampling clock signal and provides a clock signal to the first 236-1 and second 236-2 sampling circuits. In some embodiments, the timing circuit includes a PLL 312 or a DLL (not shown). In some embodiments, the timing circuit includes a phase interpolator 314 coupled to the PLL and to a sampling circuit 236 to adjust the phase of the clock signal provided to the sampling circuit. In the embodiment shown in FIG. 3, optional phase interpolators 314-1 and 314-2 couple the PLL to sampling circuits 236-1 and 236-2, respectively, to adjust the phase of the clock signal provided to the sampling circuits.

In some embodiments, the combiner 310 provides the sampling clock signal to a clipping amplifier (not shown). The clipping amplifier amplifies the sampling clock signal and provides the amplified sampling clock signal to the sampling circuits 236.

In some embodiments, one or more transmitters (e.g., 202 or 302) and one or more receivers (e.g., 206 or 306) may be implemented together in a single integrated circuit (i.e., on a single chip).

Figure 4A:
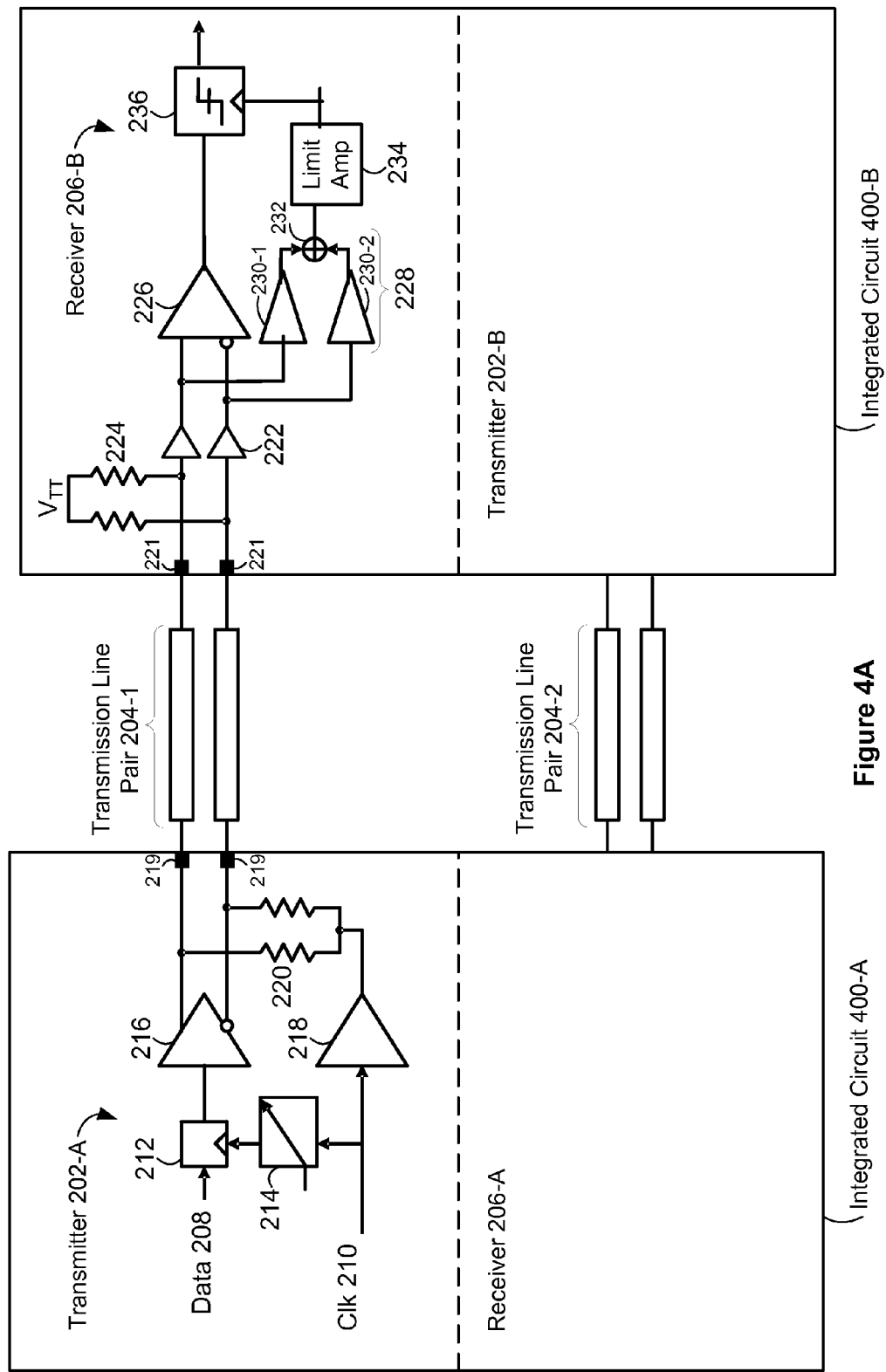
FIGS. 4A and 4B are block diagrams of two integrated circuits, each having a transmitter and a receiver, in accordance with some embodiments.
Figure 4B:
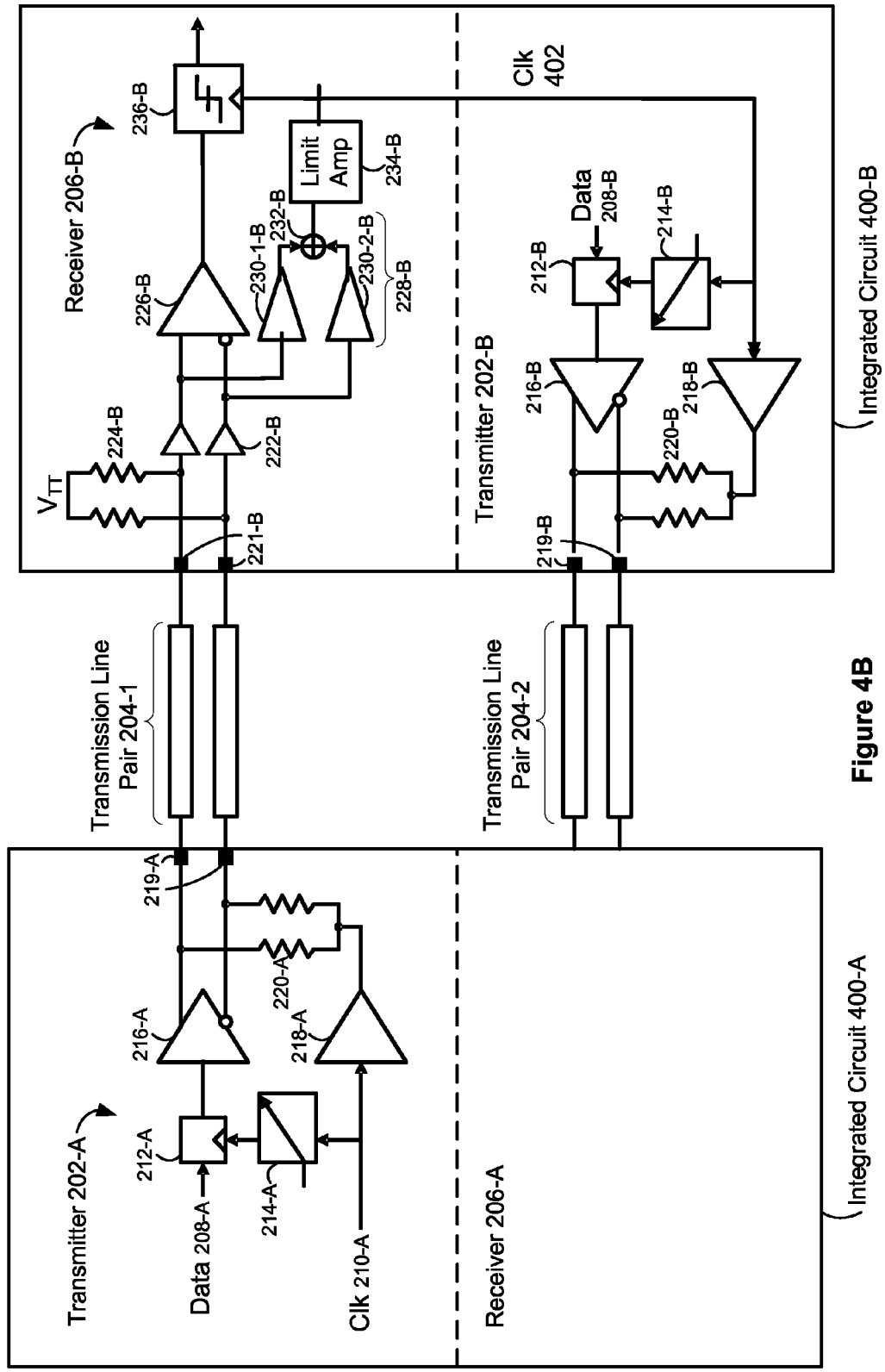

FIGS. 4A and 4B are block diagrams of two integrated circuits 400-A and 400-B, each having a transmitter 202 and a receiver 206, in accordance with some embodiments. Each transmitter 202 and each receiver 206 includes components described above with regard to FIGS. 2A and 2B. Integrated circuit 400-A may simultaneously transmit a differential-mode data signal and a common-mode clock signal to integrated circuit 400-B via a first pair of transmission lines 204-1 and may receive a transmission signal that includes a differential-mode data signal and a common-mode clock signal from integrated circuit 400-B via a second pair of transmission lines 204-2. Alternatively, integrated circuit 400-A may both transmit and receive signals via a single channel (not shown).

In some embodiments, a clock signal 402 extracted by the receiver 206-B is provided to the transmitter 202-B of the same integrated circuit 400-B, thus sharing a clock signal between the receiver 206-B and the transmitter 202-B. Clock sharing between a receiver and a transmitter in an integrated circuit saves power by eliminating the need to generate a transmitter clock, and therefore may be attractive in mobile applications such as cell phones, personal digital assistants (PDAs), and other portable devices.

In some embodiments, instead of a transmitter 202 and a receiver 206, each integrated circuit 400-A and 400-B has two transmitters 302 and two receivers 306 (FIG. 3).

Attention is now directed to methods of transmitting and receiving data.

Figure 5A:
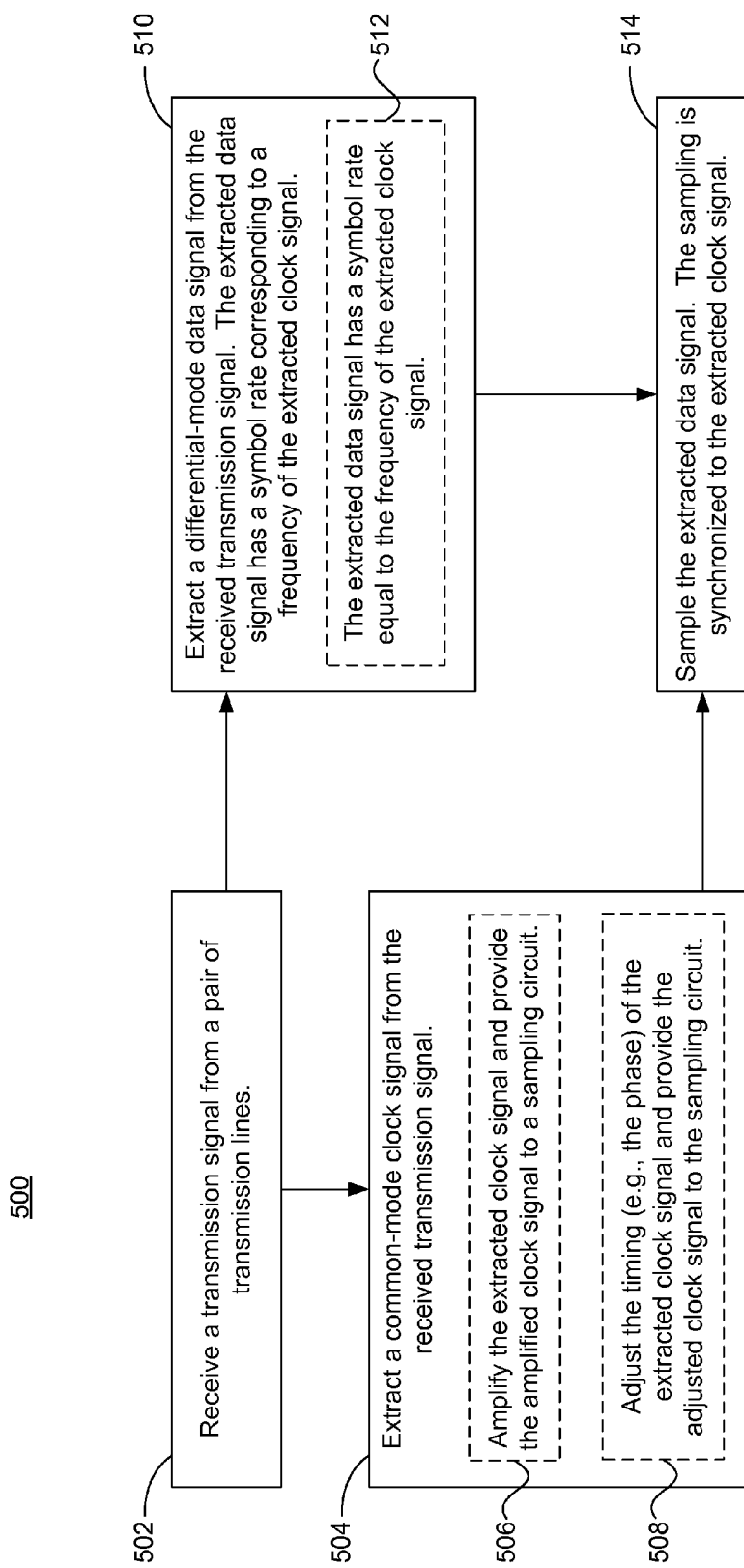
FIGS. 5A and 5B are flow diagrams illustrating a method of receiving data in accordance with some embodiments.

FIG. 5A is a flow diagram illustrating a method 500 of receiving data in accordance with some embodiments. While the method 500 described below includes operations that appear to occur in a specific order, it should be apparent that the method 500 can include more or fewer operations, that two or more of the operations can be performed in parallel, and that two or more operations can be combined into a single operation.

A transmission signal is received (502) from a pair of transmission lines. For example, the receiver 206 receives a transmission signal from a pair of transmission lines 204.

A common mode clock signal is extracted (504) from the received transmission signal. For example, the common mode extraction circuit 228 extracts a common mode clock signal. In some embodiments, the extracted clock signal is amplified (506) (e.g., by a limit amplifier 234) and provided to a sampling circuit (e.g., 236). In some embodiments, the timing of the extracted clock signal is adjusted (508) and the adjusted clock signal is provided to the sampling circuit. For example, a PLL (e.g., 244) receives the extracted clock signal and provides a clock signal to the sampling circuit. In some embodiments, adjusting the timing of the extracted clock signal includes adjusting the phase of the extracted clock signal. For example, a phase interpolator adjusts the phase of the extracted clock signal and provides the phase-adjusted extracted clock signal to the sampling circuit.

A differential-mode data signal is extracted (510) from the received transmission signal. The extracted data signal has a symbol rate corresponding to a frequency of the extracted clock signal. For example, the differential mode extraction circuit 226 extracts a differential-mode data signal from the received transmission signal. In some embodiments, the extracted data signal has a symbol rate equal (512) to the frequency of the extracted clock signal.

The extracted data signal is sampled (514) (e.g., by the sampling circuit 236). The sampling is synchronized to the extracted clock signal. In some embodiments, synchronization of the sampling to the extracted clock signal is achieved by providing the amplified extracted clock signal to the sampling circuit. In some embodiments, synchronization of the sampling to the extracted clock signal is achieved by providing a clock signal output by a PLL (e.g., 244) or by a DLL to the sampling circuit, wherein the input to the PLL or to the DLL is the extracted clock signal. In some embodiments, synchronizing the sampling to the extracted clock signal includes adjusting the phase of the clock signal provided to the sampling circuit. In some embodiments, as shown in FIGS. 2A and 2B, the extracted data signal and the extracted clock signal are extracted simultaneously.

Figure 5B:
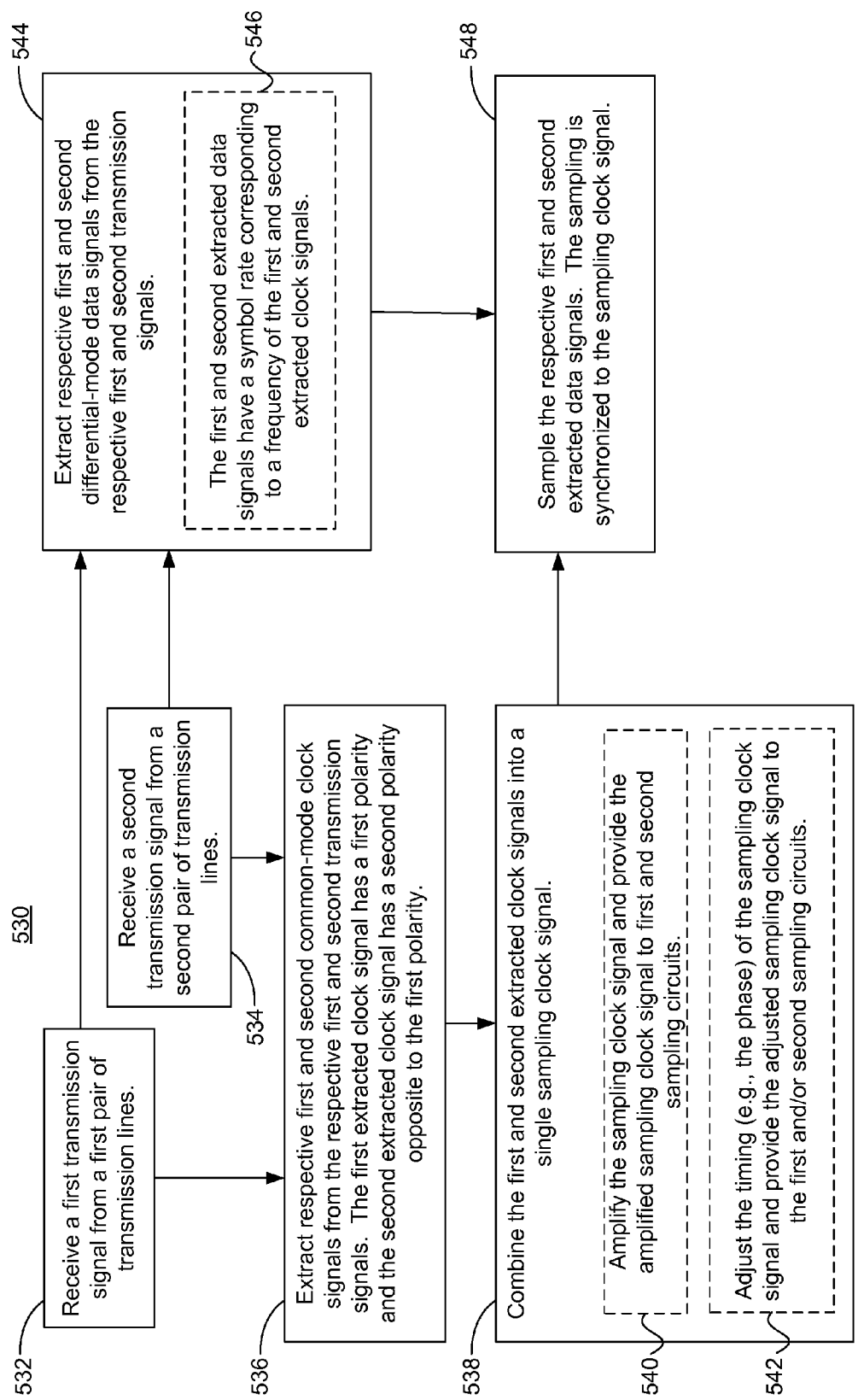

FIG. 5B is a flow diagram illustrating a method 530 of receiving data in accordance with some embodiments. While the method 530 described below includes operations that appear to occur in a specific order, it should be apparent that the method 530 can include more or fewer operations, that two or more of the operations can be performed in parallel, and that two or more operations can be combined into a single operation.

A first transmission signal is received (532) from a first pair of transmission lines (e.g., 204-1; FIG. 3) and a second transmission signal is received (534) from a second pair of transmission lines (e.g., 204-2).

Respective first and second common-mode clock signals are extracted (536) from the respective first and second transmission signals. The first extracted clock signal has a first polarity and the second extracted clock signal has a second polarity opposite to the first polarity. For example, common-mode extraction circuits 228-1 and 228-2 (FIG. 3) extract first and second common-mode clock signals that have opposite polarities.

The first and second extracted clock signals are combined (538) into a single sampling clock signal. For example, the combiner 310 combines the first and second common-mode clock signals extracted by the common-mode extraction circuits 228-1 and 228-2. In some embodiments, the sampling clock signal is amplified (540) and the amplified sampling clock signal is provided to first and second sampling circuits (e.g., 236-1 and 236-2). In some embodiments, the timing (e.g., the phase) of the sampling clock signal is adjusted (542) and the adjusted sampling clock signal is provided to the first and/or second sampling circuits. For example, a PLL 312 and/or a phase interpolator 314 adjust the timing of the sampling clock signal provided to a sampling circuit.

First and second differential-mode data signals are extracted (544) from the respective first and second transmission signals. For example, the first and second differential mode extraction circuits 226-1 and 226-2 (FIG. 3) extract respective first and second differential-mode data signals from the respective first and second transmission signals. In some embodiments, the first and second extracted data signals have a symbol rate (546) corresponding to a frequency of the first and second extracted clock signals. In some embodiments, the first and second extracted data signals have a symbol rate equal to a frequency of the first and second extracted clock signals.

The respective first and second extracted data signals are sampled (548). For example, the first and second sampling circuits 236-1 and 236-2 sample the respective first and second extracted data signals. The sampling is synchronized to the sampling clock signal. In some embodiments, as shown in FIG. 3, the first and second extracted data signals and the first and second extracted clock signals are extracted simultaneously.

Figure 6A:
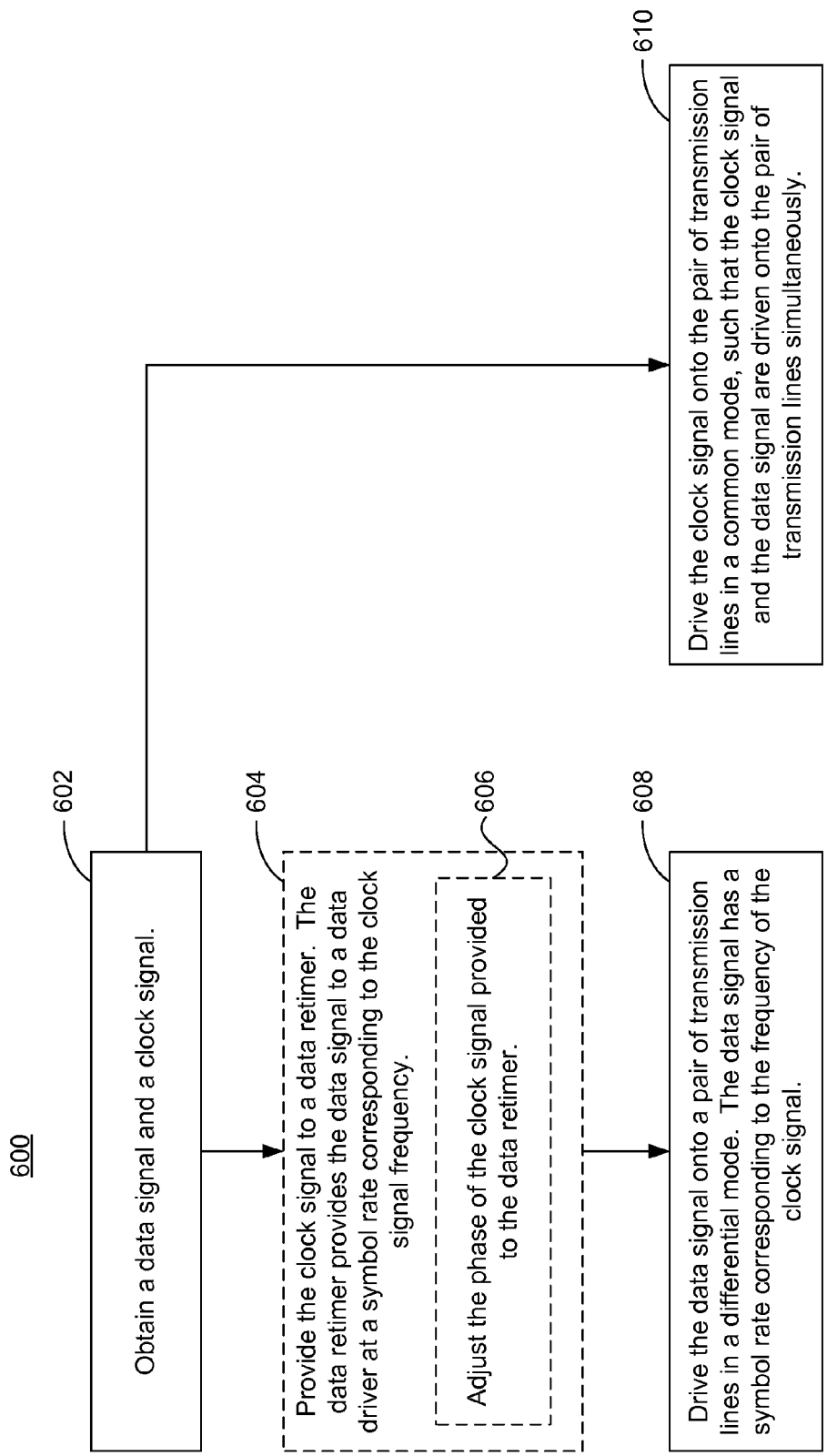
FIGS. 6A and 6B are flow diagrams illustrating a method of transmitting data in accordance with some embodiments.

FIG. 6A is a flow diagram illustrating a method 600 of transmitting data in accordance with some embodiments. While the method 600 described below includes operations that appear to occur in a specific order, it should be apparent that the method 600 can include more or fewer operations, that two or more of the operations can be performed in parallel, and that two or more operations can be combined into a single operation.

A data signal and a clock signal are obtained (602). For example, the transmitter 202 obtains for transmission a data signal 208 and a clock signal 210 (FIG. 2A).

In some embodiments, the clock signal is provided (604) to a data retimer (e.g., 212). The data retimer provides the data signal to a data driver (e.g., 216) at a symbol rate corresponding to the clock signal frequency. In some embodiments, the data retimer provides the data signal to a data driver at a symbol rate equal to the clock signal frequency.

In some embodiments, the phase of the clock signal provided to the data retimer is adjusted (606). For example, the phase adjuster 214 receives the clock signal 210 and provides a phase-adjusted clock signal to a data retimer 212. In some embodiments, the phase adjuster 214 is a phase interpolator. In some embodiments, the phase adjuster 214 is a PLL or a DLL.

The data signal is driven (608) onto a pair transmission lines (e.g., 204) in a differential mode (e.g., by the data driver 216). The data signal has a symbol rate corresponding to the clock signal frequency. In some embodiments, the data signal has a symbol rate equal to the clock signal frequency.

The clock signal is driven (610) onto the pair of transmission lines in a common mode (e.g., by the clock driver 218), such that the clock signal and the data signal are driven onto the pair of transmission lines simultaneously.

Figure 6B:
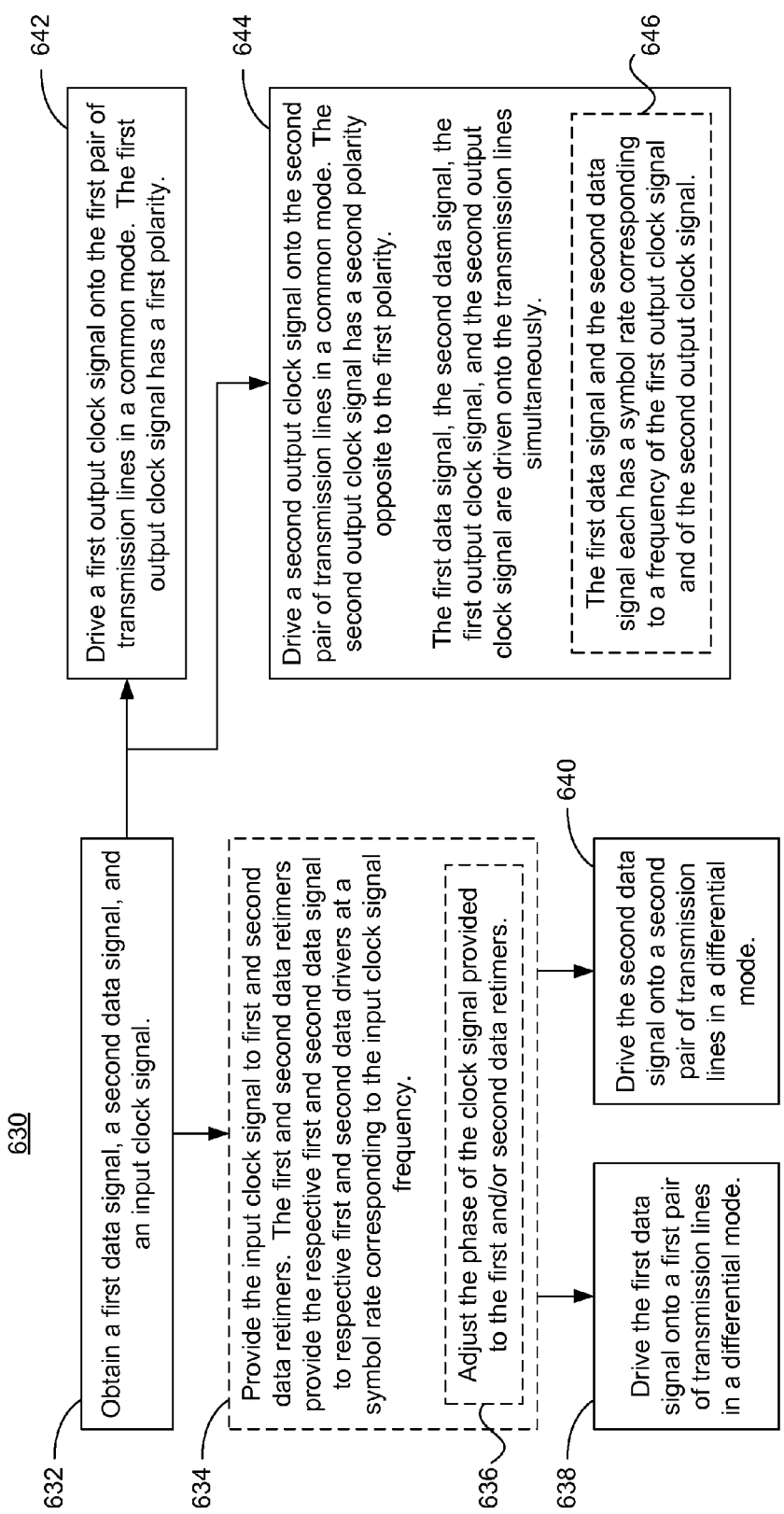

FIG. 6B is a flow diagram illustrating a method 630 of transmitting data in accordance with some embodiments. While the method 630 described below includes operations that appear to occur in a specific order, it should be apparent that the method 630 can include more or fewer operations, that two or more of the operations can be performed in parallel, and that two or more operations can be combined into a single operation.

A first data signal, a second data signal, and an input clock signal are obtained (632). For example, transmitters 302-1 and 302-2 obtain a first data signal 208-1, a second data signal 208-2, and a clock signal 210 (FIG. 3).

In some embodiments, the input clock signal is provided (634) to first and second data retimers (e.g., 212-1 and 212-2). The first and second data retimers provide the respective first and second data signals to respective first and second data drivers at a symbol rate corresponding to the input clock signal frequency. In some embodiments, the first and second data retimers provide the respective first and second data signals to respective first and second data drivers at a symbol rate equal to the input clock signal frequency.

In some embodiments, the phase of the clock signal provided to the first and/or second data retimers is adjusted (636).

The first data signal is driven (638) onto a first pair of transmission lines in a differential mode and the second data signal is driven (640) onto a second pair of transmission lines in a differential mode. For example, the first and second data drivers 216-1 and 216-2 drive the respective first and second data signals onto the respective first and second transmission line pairs 204-1 and 204-2 in a differential mode.

A first output clock signal is driven (642) onto the first pair of transmission lines (e.g., 204-1) in a common mode (e.g., by the clock driver 308). The first output clock signal has a first polarity. A second output clock signal is driven (644) onto the second pair of transmission lines (e.g., 204-2) in a common mode (e.g., by the clock driver 308). The second output clock signal has a second polarity opposite to the first polarity. The first data signal, the second data signal, the first output clock signal, and the second output clock signal are driven onto the transmission lines simultaneously.

In some embodiments, the first data signal and the second data signal each has a symbol rate (646) corresponding to a frequency of the first output clock signal and of the second output clock signal. In some embodiments, the first data signal and the second data signal each has a symbol rate equal to a frequency of the first output clock signal and of the second output clock signal.

The method 630 illustrated in FIG. 6B involves transmitting two data signals, each in a differential mode on a respective pair of transmission lines, while a clock signal is effectively transmitted in a differential mode on two pairs of transmission lines, wherein each pair transmits a polarity of the clock signal in a common mode. In a complementary method, clock signals are transmitted in a differential mode on respective pairs of transmission lines and a data signal is effectively transmitted in a differential mode on two pairs of transmission lines, wherein each pair transmits a polarity of the data signal in a common mode.

Attention is now directed to embodiments in which a clock signal and a data signal are simultaneously transmitted over a channel, wherein the clock signal is transmitted at a frequency greater than or equal to the symbol rate of the data signal.

Figure 7C:
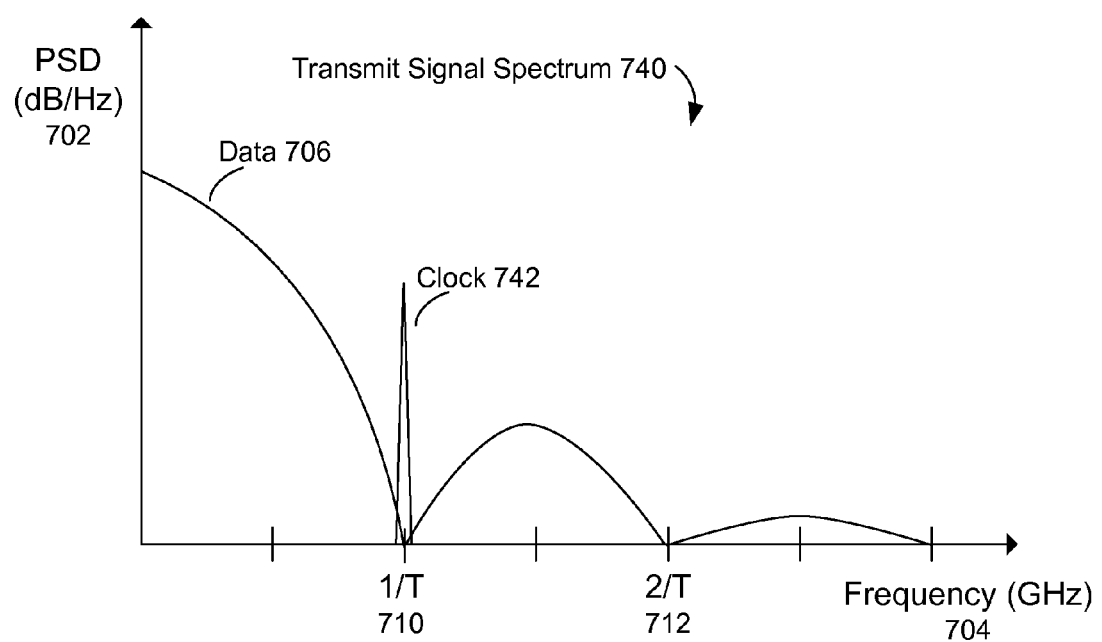

FIGS. 7A-7C depict prophetic transmit signal spectrums 700 (FIG. 7A), 720 (FIG. 7B), and 740 (FIG. 7C) for three cases of a data signal and a clock signal simultaneously transmitted over a channel in accordance with some embodiments. The transmit signal spectrums 700, 720, and 740 are represented by the single-ended power spectral densities (PSD) 702 as a function of frequency 704, where single-ended PSD 702 is measured in decibels per hertz (dB/Hz) and frequency 704 is measured in gigahertz (GHz). In some embodiments, the channel includes one or more transmission lines, such as a pair of transmission lines.

The data signal 706 has a symbol period T and a symbol rate 1/T 710. In some embodiments, the clock signal has a frequency equal to an integer multiple of the symbol rate, where the integer is greater than one. For example, in the transmit signal spectrum 700, the clock signal 708 has a frequency 712 equal to twice the symbol rate 710. In some embodiments, the clock signal has a frequency equal to a non-integer multiple of the symbol rate. For example, in the transmit signal spectrum 720, the clock signal 722 has a frequency 724 equal to 1.5 times the symbol rate 710. In some embodiments, the clock signal has a frequency equal to an integer multiple of the symbol rate, where the integer is equal to one. For example, in the transmit signal spectrum 740, the clock signal 742 has a frequency equal to the symbol rate 710.

FIG. 7D illustrates waveforms associated with simultaneously transmitting data and clock signals over a channel in accordance with some embodiments. In a first example, a waveform 750 corresponds to a particular polarity of a differential-mode data signal and a waveform 752 corresponds to a particular polarity of a differential-mode clock signal. The data signal and clock signal are simultaneously transmitted over a pair of transmission lines, such that the symbol rate equals the clock frequency. Other implementations may choose to transmit simultaneously over another propagation mode such as common-mode. A waveform 756 results on the first transmission line of the pair and a waveform 760 results on the second transmission line of the pair. In this example, data transitions are phase-aligned with rising clock edges. A receiver can recover the clock and data waveforms 750 and 752 from the transmitted waveforms 756 and 760, as described below. In some embodiments, a receiver's sampling of a data bit in a received data signal is timed using a clock edge with which the data bit was aligned for transmission.

A second example includes the waveform 750 corresponding to the differential-mode data signal and a waveform 754 corresponding to a particular polarity of a differential-mode clock signal. The data and clock signals are simultaneously transmitted over a pair of transmission lines. A waveform 758 results on the first transmission line of the pair and a waveform 762 results on the second transmission line of the pair. In this example, rising clock edges are phase-aligned with the center of data bits. Timing data and clock signals such that rising clock edges are approximately phase-aligned with the center of data bits is desirable for receiver sampling because it provides set-up time for data bits prior to sampling.

In the examples of FIG. 7D, the clock and data waveforms have equal amplitudes. In other examples, the amplitudes may be distinct. For example, in FIG. 7E, the amplitude of the data waveform 770 is twice the amplitude of the clock waveform 772, resulting in waveforms 774 and 776 on the transmission line pair. (Waveforms 774 and 776 are not drawn to scale with respect to waveforms 770 and 772.) In other examples, the clock frequency may exceed the symbol rate. FIGS. 7D and 7E are examples of different amplitude ratios between transmitted differential and common-mode signals. It follows from examples 7D and 7E that the ratio of the differential and common-mode signal may be selected to have some fractional amplitude relationship with the possibility of either signal being the larger, as conditions dictate.

Figure 8A:
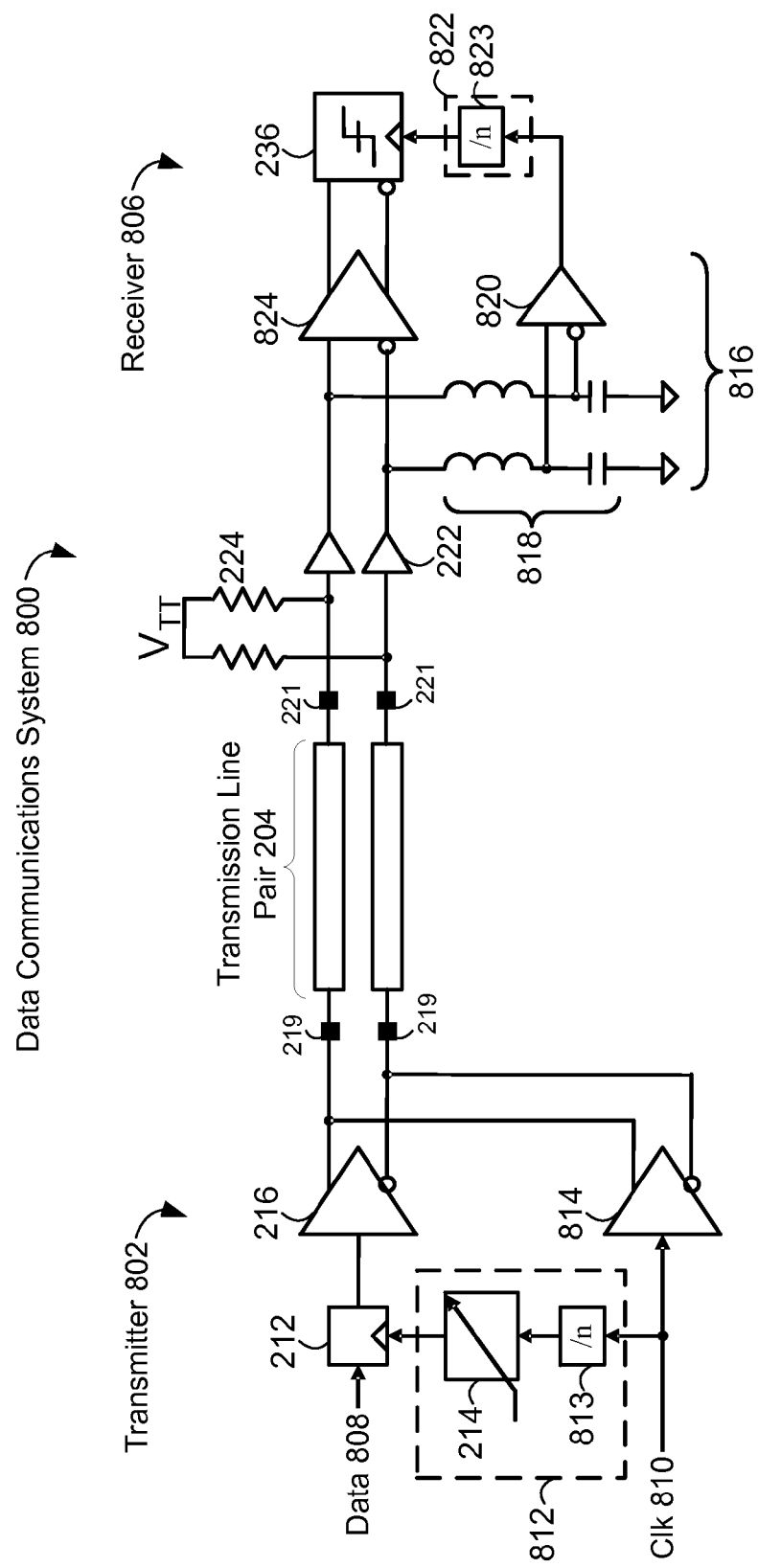
FIGS. 8A-8C are block diagrams of a data communications system in accordance with some embodiments.

FIG. 8A is a block diagram of a data communications system 800 in accordance with some embodiments. The data communications system 800 includes a transmitter 802, a pair of transmission lines 204, and a receiver 806.

The transmitter 802 receives for transmission a data signal 808 and a clock signal 810. A clock driver 814 drives the clock signal 810 via interfaces 219 onto the pair of transmission lines 204. In some embodiments, the clock signal 810 is a single tone, or sinusoidal, wave. In some embodiments, the interfaces 219 include pins, balls, or other electrical contacts on a semiconductor package.

The clock signal 810 has a first frequency (i.e., the frequency of the clock signal). A timing circuit 812 receives the clock signal 810 and outputs a symbol clock that has a second frequency, wherein the first frequency is a multiple n of the second frequency. In some embodiments, the multiple n is an integer multiple; in some other embodiments, the multiple n is a non-integer multiple equal to a ratio of whole-numbers. In some embodiments, the timing circuit 812 includes a clock divider 813.

In some embodiments, the timing circuit 812 includes a phase adjuster 214. For example, the output of the timing circuit 812 (e.g., a clock divider 813) is coupled to the input of the phase adjuster 214 to adjust the phase of the symbol clock. In some embodiments, the phase adjuster 214 is a phase interpolator. The phase adjuster adjusts the phase of the symbol clock and provides the phase-adjusted symbol clock to a data retimer 212.

Alternately, in some embodiments, a phase adjuster is coupled to the input of a clock divider (not shown). The phase adjuster receives the clock signal 810, adjusts the phase of the clock signal, and provides the phase-adjusted clock signal to the input of the clock divider, which generates the symbol clock.

The data retimer 212 receives the data signal 208 and provides the data signal to the data driver 216 at a symbol rate corresponding to the frequency of the symbol clock. The data driver 216 drives the data signal via interfaces 219 onto the pair of transmission lines 204 with a symbol rate corresponding to the frequency of the symbol clock. In some embodiments, the data driver 216 drives the data signal onto the pair of transmission lines 204 using non-return-to-zero (NRZ) formatting, such that a value of the data signal does not transition between successive symbol clock periods if the values of successive signal points corresponding to the successive symbol clock periods are equal. The receiver 806 can extract the data signal, even in the absence of transitions, by extracting the clock signal and generating a symbol clock to time sampling of the data signal, as described below with regard to the receiver 806.

In some embodiments, the data driver 216 transmits the data signal in a differential mode. In some embodiments, the clock driver 810 transmits the clock signal in a differential mode. In some other embodiments, the clock signal is transmitted in a common mode.

Figure 8B:
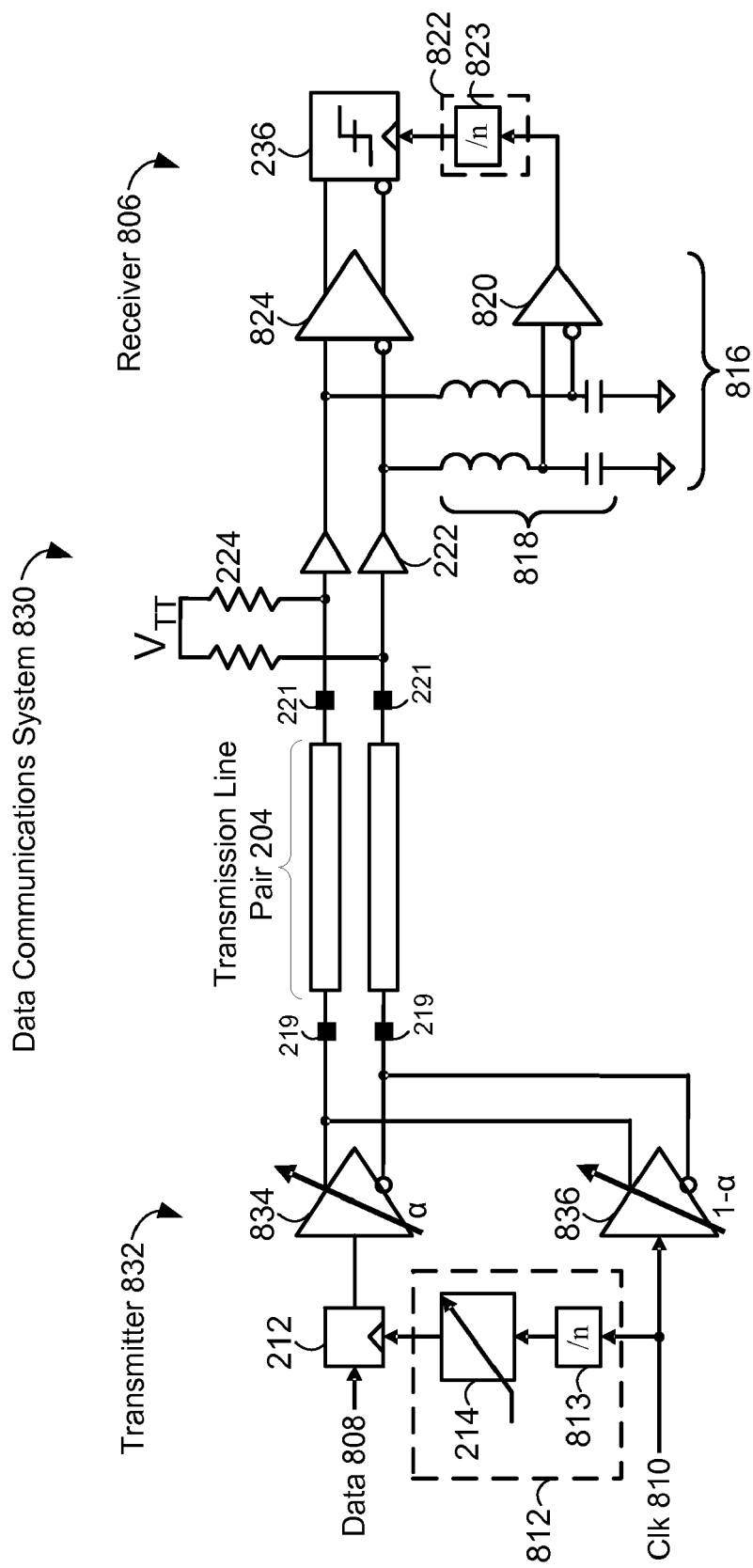

In some embodiments, the data driver and clock driver have programmable drive strengths, as shown for data driver 834 and clock driver 836 of transmitter 832 in data communications system 830 (FIG. 8B). In some embodiments, the drive strengths (i.e., output swings) for the data driver 834 and the clock driver 836 are complementary: if the data driver 834 has a normalized drive strength of a, the clock driver 836 has a normalized drive strength of 1-α. The combined output swing of the data driver 834 and clock driver 836 thus remains substantially constant and the respective drive strengths of the data driver 834 and the clock driver 836 can be traded off against each other to optimize signal quality. Increasing the drive strength of the clock driver 836 improves reception of the clock signal by the receiver 806, reducing jitter and improving timing margin for reception of the data signal. Increasing the drive strength of the clock driver 834 improves voltage margin for reception of the data signal by the receiver 806.

The receiver 806 receives via interfaces 221 a transmission signal that includes the data signal and the clock signal. In some embodiments, the interfaces 221 include pins, balls, or other electrical contacts on a semiconductor package. A data extraction circuit 824 extracts the data signal from the received transmission signal. The extracted data signal is provided to a sampling circuit 236 that samples the extracted data signal.

A clock extraction circuit 816 extracts the clock signal from the received transmission signal. The extracted clock signal has a first frequency (i.e., the frequency of the extracted clock signal).

A timing circuit 822 receives the extracted clock signal and generates a symbol clock having a second frequency. The first frequency is a multiple n of the second frequency, wherein the multiple n is greater than one. In some embodiments, the timing circuit 822 includes a clock divider 823. The symbol clock is provided to the sampling circuit 236, which is synchronized to the symbol clock.

In some embodiments, clock extraction circuitry includes filter circuitry to substantially filter out the clock signal from a data signal path to the sampling circuit 236 and to substantially filter out the data signal from a clock signal path to the timing circuit 822. The filter circuitry has a center frequency approximately equal to the first frequency. Thus, the filter circuitry acts as a band-reject filter on a data signal path to the sampling circuit 236 and acts as a band-pass filter for a clock signal path to the timing circuit 822. For example, the clock extraction circuit 816 includes an LC network 818 coupled to a buffer 820. The LC network 818 is a resonant network with a resonant frequency approximately equal to the first frequency that substantially filters out the clock signal from the signal provided to the data extraction circuit 824 and substantially filters out the data signal from the signal provided to the buffer 820 and to the timing circuit 822. Thus, the resonant network substantially filters out the clock signal from a data signal path to the sampling circuit 236, and substantially filters out the data signal from a clock signal path to the timing circuit 822. In some embodiments, the resonant network acts as a band-reject filter on a data signal path to the sampling circuit 236, and acts as a band-pass filter for a clock signal path to the timing circuit 822. In some embodiments the LC network may vary from the one shown in 816. For example, the positions of the L and C elements may be reversed.

In some embodiments, the receiver 806 includes buffers 222 to isolate the receiver circuitry from the pair of transmission lines 204. In some embodiments, termination resistors 224 terminate the pair of transmission lines 204.

In some embodiments, one or more transmitters 802 and one or more receivers 806 may be implemented together in a single integrated circuit (i.e., on a single chip), in a manner analogous to the integrated circuit 400 of FIGS. 4A and 4B. For example, a symbol clock generated by the timing circuit 822 may be provided to a transmitter (e.g., provided as a clock signal 810 to a transmitter 802) on the same chip as the receiver 806.

Figure 8C:
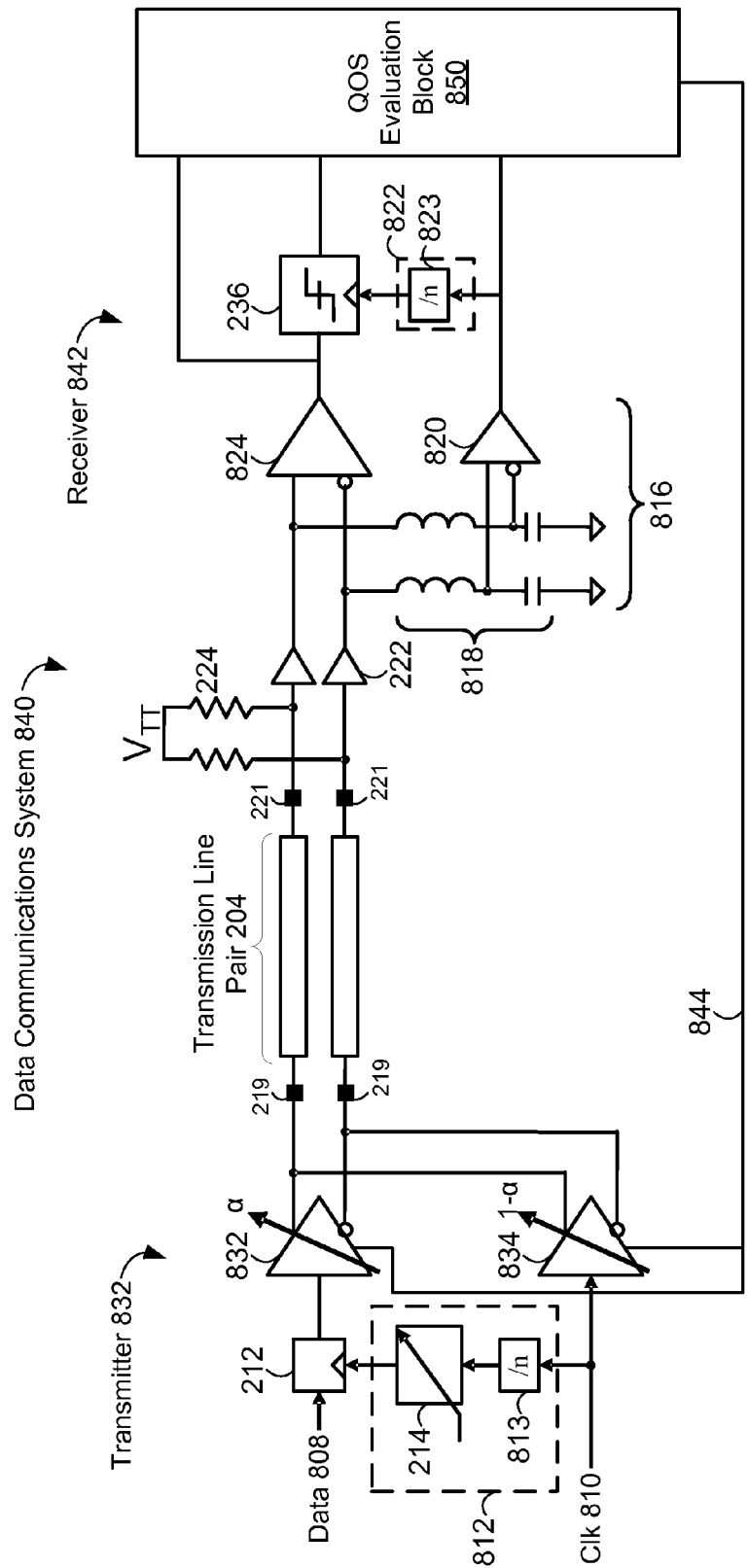
Figure 8D:
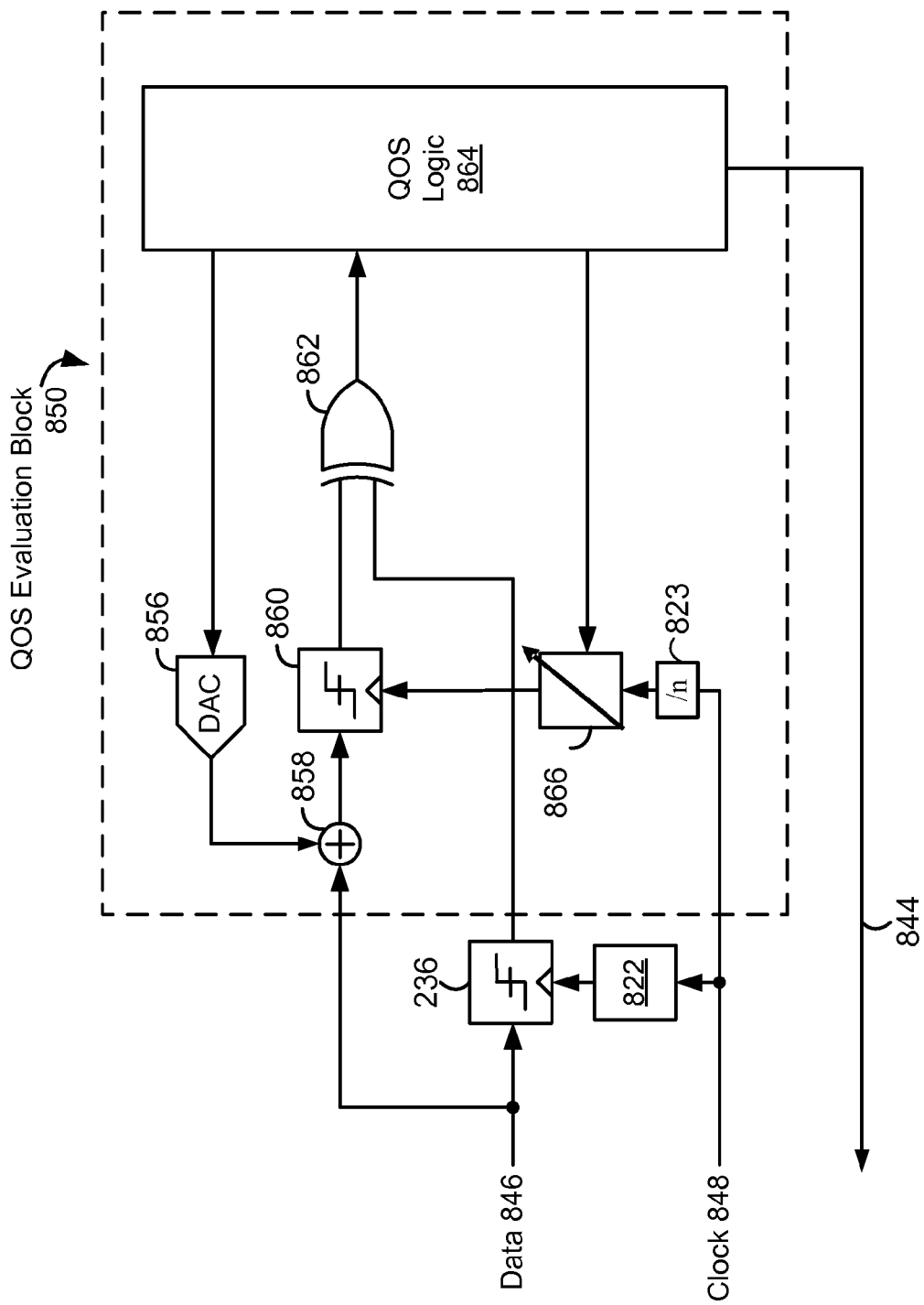
FIG. 8D is a block diagram of receiver circuitry including a Quality of Signal (QOS) evaluation block in accordance with some embodiments.

In some embodiments, receiver circuitry includes a Quality of Signal (QOS) evaluation block 850, as shown for receiver 842 in FIGS. 8C and 8D. The QOS evaluation block 850 evaluates voltage and timing margins of data signals received by the receiver 842. In some embodiments, the QOS evaluation block 850 provides instructions to the transmitter 832 to adjust the drive strengths of the programmable data driver 834 and clock driver 836 in the transmitter 832, to improve or optimize timing or voltage margins. In some embodiments, the QOS evaluation block 850 includes QOS logic 864, a digital-to-analog converter 856, a combiner 858, a sampling circuit 860, a variable delay 866, and an XOR gate 862. The QOS evaluation block 850 may also include a clock divider 823.

The extracted data signal 846 provided to the sampling circuit 236 is also provided to the combiner 858, which adds a voltage offset received from the DAC 856 as specified by the QOS logic 864. The combiner 858 provides the offset data signal to the sampling circuit 860, which samples the offset data signal. The extracted clock signal 848 provided to the timing circuit 822 is also provided to a clock divider 823; the divided clock signal is provided to a variable delay circuit 866 having a variable delay specified by the QOS logic 864. Alternately, the output of the timing circuit 822 is provided to the variable delay circuit 866. The variable delay circuit 866 provides the delayed clock signal to the sampling circuit 860, which is synchronized to the delayed clock signal. The outputs of the sampling circuits 236 and 860 are provided to the XOR gate 862, which acts as a comparator that compares the two outputs and provides the result of the comparison to the QOS logic 864.

If the outputs of the sampling circuits 236 and 860 agree, the sampling circuit 860 is presumed to be sampling within an eye opening in a plot of signal voltage level vs. time for the receiver 842. The eye opening corresponds to a set of combinations of signal voltage levels and sampling times for which received 1's can be distinguished from received 0's. If the outputs of the sampling circuits 236 and 860 do not agree, the sampling circuit 860 is presumed to be sampling outside of the eye opening. In some embodiments, the outputs of the sampling circuits 236 and 860 are considered to agree if at least a minimum percentage (e.g., 99.9%) of respective samples of the sampling circuits 236 and 860 are equal (i.e., are both 1 or 0) for a particular combination of voltage offset and delay value, and are considered not to agree if less than the minimum percentage of respective samples are equal. The QOS logic 864 thus can map out the eye opening by varying the voltage offset and delay value and comparing the outputs of the sampling circuits 236 and 860 for various combinations of voltage offset and delay values.

Figure 8F:
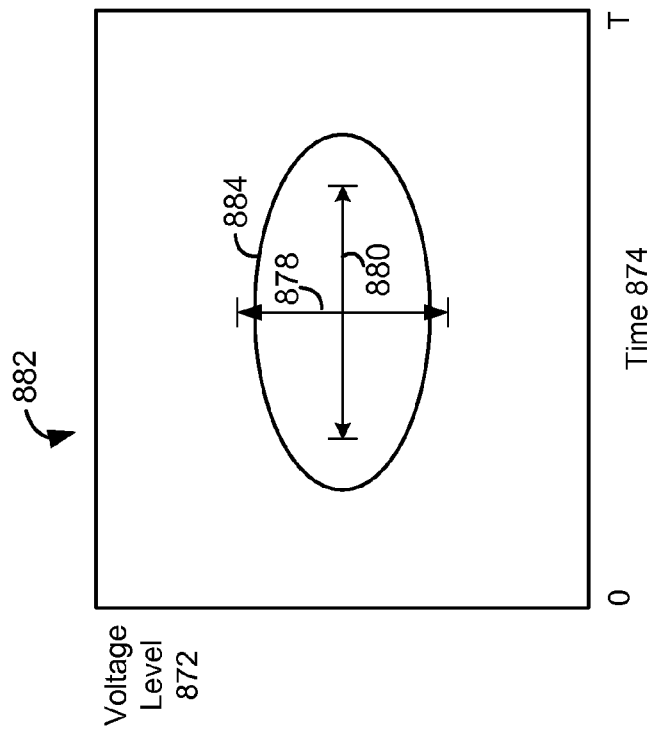
FIGS. 8E and 8F illustrate eye openings in plots of voltage level vs. time in accordance with some embodiments.
Figure 8E:
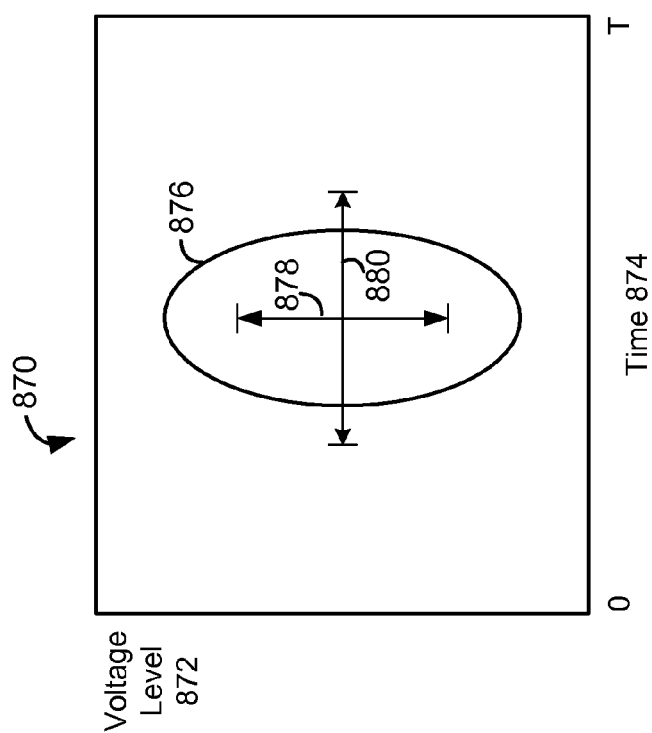

FIGS. 8E and 8F illustrate eye openings 876 and 884 in plots 870 and 882 of voltage level 872 vs. time 874 in accordance with some embodiments. The time 874 is shown as varying between zero and the symbol period T. The center of the eye opening 876 has a height greater than a defined minimum voltage margin 878, but has a width less than a defined minimum timing margin 880. The center of the eye opening 884 has a width greater than the minimum timing margin 880, but has a height less than the minimum voltage margin 878. In some embodiments, the minimum voltage margin 878 and minimum timing margin 880 are determined to ensure that the bit-error rate (BER) for the receiver 842 does not exceed a predefined maximum BER.

In some embodiments, the QOS logic 864 communicates with the transmitter 832 to adjust the drive strengths of the programmable data driver 834 and clock driver 836 based on characterization of the eye diagram for the receiver 842. If characterization reveals that the height of the eye opening is insufficient, indicating a lack of voltage margin (e.g., for eye opening 884), then the drive strength of the data driver 834 is increased (i.e., a is increased). If characterization reveals that the width of the eye opening is insufficient, indicating a lack of timing margin (e.g., for eye opening 876), then the drive strength of the clock driver 836 is increased (i.e., a is decreased). Iterative characterization of voltage and timing margins and adjustment of drive strength is performed until the characterized voltage and timing margins exceed the respective minimum voltage and timing margins.

In some embodiments, the QOS logic 864 communicates with the programmable drivers 834 and 836 via a backchannel 844, which may include a single transmission line or a pair of transmission lines. In some embodiments, the QOS logic 864 communicates with the programmable drivers 834 and 836 via the transmission line pair 204: for example, a transmitter located in an integrated circuit that also includes the receiver 842 drives data from the QOS logic 864 onto the transmission line pair 204.

In some embodiments, the QOS evaluation block 850 may be used to evaluate signals from receivers 206 (FIG. 2A), 242 (FIG. 2B), or 306 (FIG. 3). For example, the data signal from a differential mode extraction circuit 226, the sampled data from the corresponding sampling circuit 236, and the clock signal provided by the limit amplifier 234, PLL 244, or PLL 312 are provided to the QOS evaluation block 850 in a manner analogous to that shown in FIG. 8D.

Figure 9A:
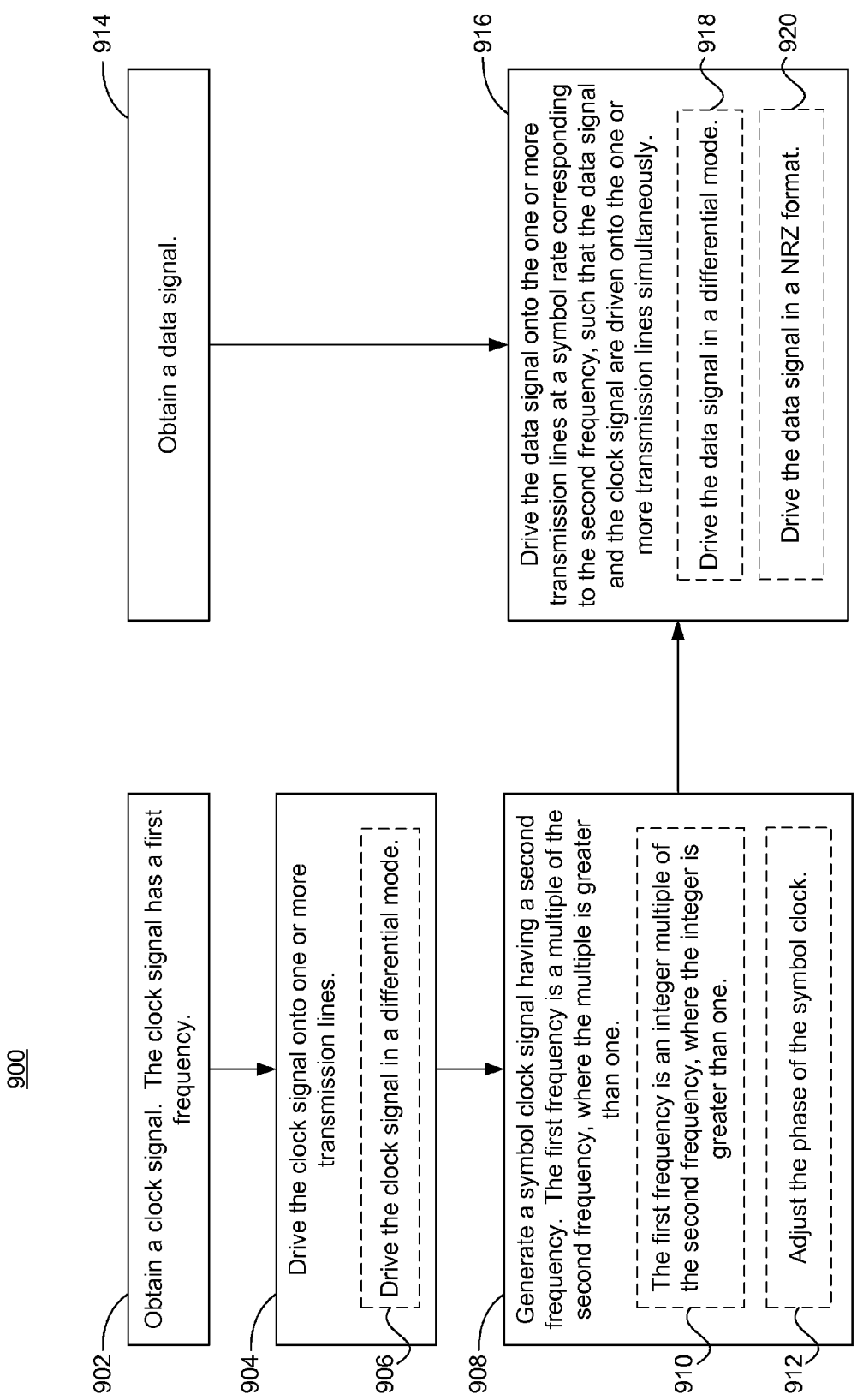
FIG. 9A is a flow diagram illustrating a method of transmitting data in accordance with some embodiments.

FIG. 9A is a flow diagram illustrating a method 900 of transmitting data in accordance with some embodiments. While the method 900 described below includes operations that appear to occur in a specific order, it should be apparent that the method 900 can include more or fewer operations, that two or more of the operations can be performed in parallel, and that two or more operations can be combined into a single operation.

A clock signal is obtained (902). The clock signal has a first frequency. For example, the transmitter 802 (FIG. 8) obtains the clock signal 810.

The clock signal is driven (904) onto one or more transmission lines (e.g., by the clock driver 814 or 836). In some embodiments, the clock signal is driven onto a pair of transmission lines in a differential mode (906).

A symbol clock signal is generated (908) having a second frequency. In some embodiments, a timing circuit receives the clock signal and generates the symbol clock. In some embodiments, the timing circuit 812 includes a clock divider 813 (e.g., the clock divider shown in FIG. 8). The first frequency is a multiple of the second frequency, where the multiple is greater than one. In some embodiments, the first rate is an integer multiple of the second rate (910), where the integer is greater than one.

In some embodiments, the phase of the symbol clock is adjusted (912). For example, the timing circuit includes a phase adjuster (e.g., 214) coupled to the output of a clock divider (e.g., 812) to adjust the phase of the symbol clock. In some embodiments, the phase of the clock signal is adjusted and the phase-adjusted clock signal is provided to a clock divider to generate the symbol clock.

A data signal is obtained (914). For example, the transmitter 802 obtains for transmission the data signal 808. The data signal is driven (916) onto the one or more transmission lines at a symbol rate corresponding to the second frequency (e.g., by the data driver 216). The data signal and the clock signal are driven onto the one or more transmission lines simultaneously. In some embodiments, the data signal is driven onto a pair of transmission lines in a differential mode (918). In some embodiments, the data signal is driven in a non-return-to-zero (NRZ) format (920).

Figure 9B:
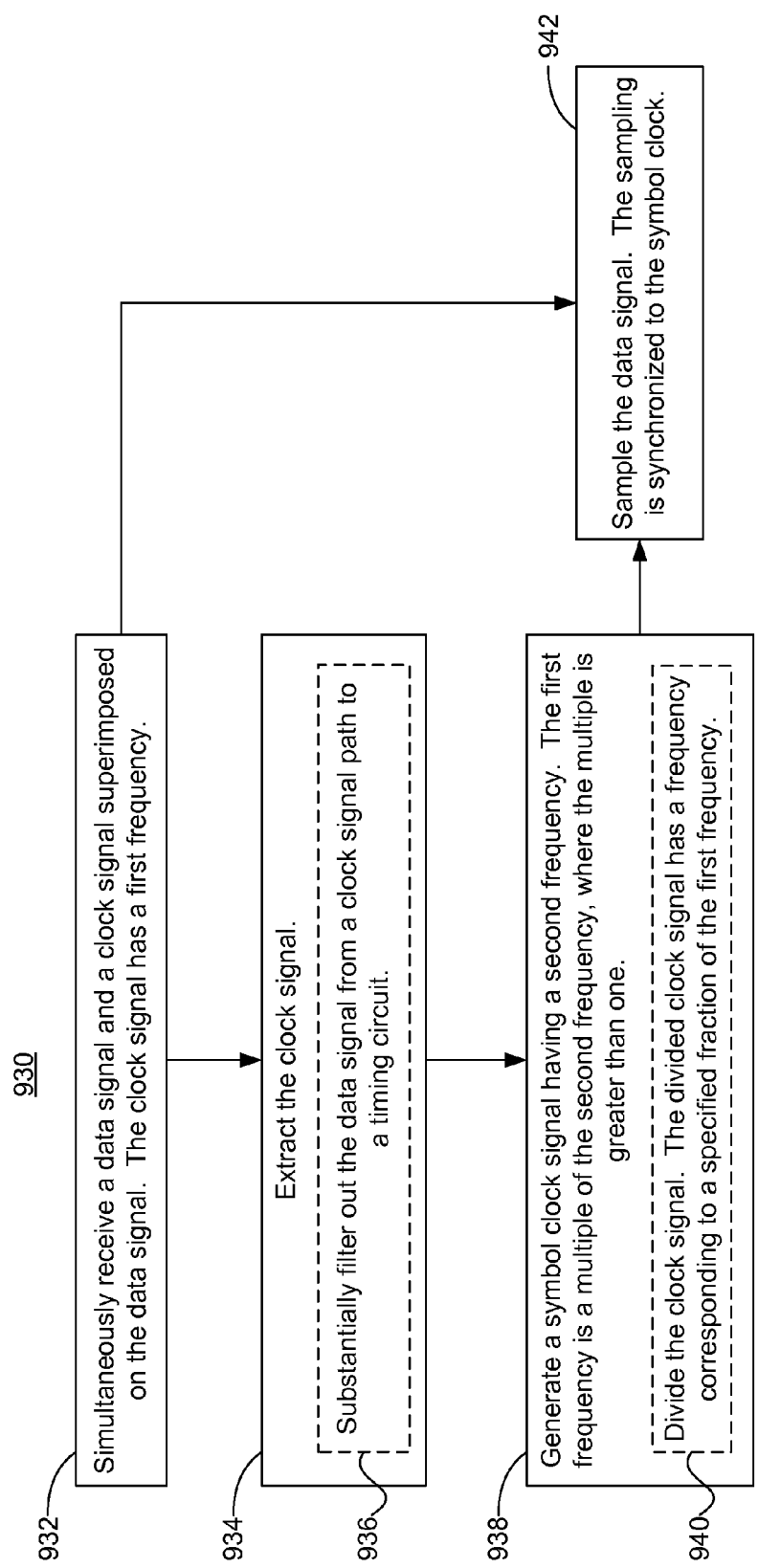
FIG. 9B is a flow diagram illustrating a method of receiving data in accordance with some embodiments.

FIG. 9B is a flow diagram illustrating a method 930 of receiving data in accordance with some embodiments. While the method 930 described below includes operations that appear to occur in a specific order, it should be apparent that the method 930 can include more or fewer operations, that two or more of the operations can be performed in parallel, and that two or more operations can be combined into a single operation.

A data signal and a clock signal superimposed on the data signal are simultaneously received (932). The clock signal has a first frequency. For example, the receiver 806 simultaneously receives a data signal and a clock signal superimposed on the data signal.

The clock signal is extracted (934) (e.g., by a clock extraction circuit 816). In some embodiments, the data signal is substantially filtered out (936) from a clock signal path to the timing circuit. For example, a resonant network (e.g., LC network 818) substantially filters out the data signal from a clock signal path to the timing circuit.

A symbol clock is generated (938) having a second frequency. The first frequency is a multiple of the second frequency, where the multiple is greater than one. In some embodiments the clock signal is divided (940); the divided clock signal has a frequency corresponding to a specified fraction of the first frequency. For example, a clock divider (e.g., 823) or other timing circuit divides the clock signal to generate the symbol clock.

The data signal is sampled (942) (e.g., by the sampling circuit 236). The sampling is synchronized to the symbol clock.

In some embodiments, a band-reject filter coupled to the sampling circuit substantially filters out the clock signal from the signal provided to the sampling circuit. In some embodiments, a resonant network (e.g., LC network 818) substantially filters out the clock signal from the signal provided to the sampling circuit.

In operation 908 of method 900 (FIG. 9A) and in operation 938 of method 930 (FIG. 9B), the ratio of the first frequency to the second frequency is described as being greater than one. In some embodiments, however, the ratio of the first frequency to the second frequency is equal to one. Similarly, in some embodiments, the timing circuit 812 (FIG. 8A) receives the clock signal 810 and outputs a symbol clock that has a second frequency equal to the frequency of the received clock signal 810. Likewise, the timing circuit 822 may output a symbol clock that has a second frequency equal to the frequency of the extracted clock signal.

Figure 10:
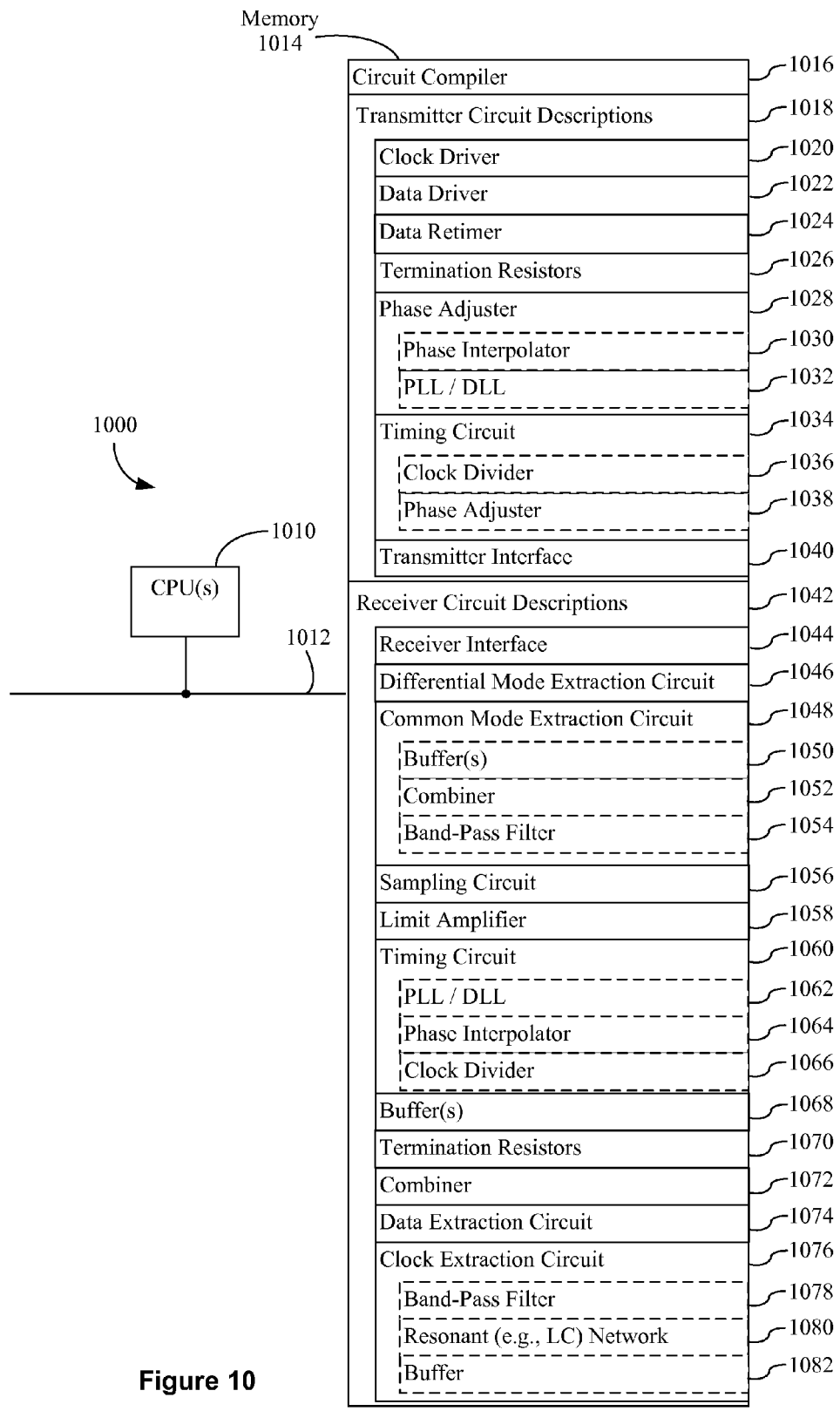
FIG. 10 is a block diagram of an embodiment of a system for storing computer readable files containing software descriptions of circuits for implementing transmitters and receivers in accordance with some embodiments.

FIG. 10 is a block diagram of an embodiment of a system 1000 for storing computer readable files containing software descriptions of circuits for implementing transmitters and receivers in accordance with some embodiments. The system 1000 may include at least one data processor or central processing unit (CPU) 1010, memory 1014, and one or more signal lines or communication busses 1012 for coupling these components to one another. Memory 1014 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1014 may optionally include one or more storage devices remotely located from the CPU(s) 1010. In some embodiments, memory 1014 stores in one or more of the previously mentioned memory devices a circuit compiler 1016, transmitter circuit descriptions 1018, and receiver circuit descriptions 1042. The circuit compiler 1016, when executed by a processor such as CPU(s) 1010, processes one or more circuit descriptions to synthesize one or more corresponding circuits.

In some embodiments, the transmitter circuit descriptions 1018 include circuit descriptions for a clock driver 1020, a data driver 1022, a data retimer 1024, termination resistors 1026, a phase adjuster 1028, a timing circuit 1034, and a transmitter interface 1040. In some embodiments, the circuit description for the phase adjuster 1028 includes circuit descriptions for a phase interpolator 1030 and for a PLL or DLL 1032. In some embodiments, the circuit description for the timing circuit 1034 includes circuit descriptions for a clock divider 1036 and for a phase adjuster 1038.

In some embodiments, the receiver circuit descriptions 1042 include circuit descriptions for a receiver interface 1044, a differential mode extraction circuit 1046, a common mode extraction circuit 1048, a sampling circuit 1056, a limit amplifier 1058, a timing circuit 1060, buffers 1068, termination resistors 1070, a combiner 1072, a data extraction circuit 1074, and a clock extraction circuit 1076. In some embodiments, the circuit description for the common mode extraction circuit 1048 includes circuit descriptions for buffers 1050, a combiner 1052, and a band-pass filter 1054. In some embodiments, the circuit description for the timing circuit 1060 includes circuit descriptions for a PLL or DLL 1062, a phase interpolator 1064, and a clock divider 1066. In some embodiments, the circuit description for the clock extraction circuit 1076 includes circuit descriptions for a band-pass filter 1078, a resonant network (e.g., an LC network) 1080, and a buffer 1082.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A data receiver circuit, comprising:
an interface to be coupled to one or more transmission lines external to the data receiver circuit, to receive simultaneously a data signal and a clock signal superimposed on the data signal, the clock signal having a first frequency;
a clock extraction circuit, coupled to the interface, to extract the clock signal;
a timing circuit to receive the clock signal and to generate a symbol clock having a second frequency, wherein the first frequency is a multiple of the second frequency, wherein the multiple is greater than one; and
a first sampling circuit synchronized to the symbol clock, to sample the data signal.

2. The data receiver circuit of claim 1, wherein the timing circuit comprises a clock divider circuit to divide the clock signal, the divided clock signal having the second frequency.

3. The data receiver circuit of claim 1, wherein the clock extraction circuit comprises a band-pass filter.

4. The data receiver circuit of claim 1, additionally comprising a band-reject filter coupled to the first sampling circuit to substantially filter out the clock signal.

5. The data receiver circuit of claim 1, additionally comprising filter circuitry to substantially filter out the clock signal from a data signal path to the first sampling circuit and to substantially filter out the data signal from a clock signal path to the timing circuit, the filter circuitry having a center frequency approximately equal to the first frequency.

6. The data receiver circuit of claim 5, wherein the filter circuitry comprises a resonant network.

7. The data receiver circuit of claim 1, additionally comprising filter circuitry having a center frequency approximately equal to the first frequency, the filter circuitry to act as a band-reject filter on a data signal path to the first sampling circuit and to act as a band-pass filter for a clock signal path to the timing circuit.

8. The data receiver circuit of claim 7, wherein the filter circuitry comprises a resonant network.

9. The data receiver circuit of claim 1, wherein the received data signal is in a differential mode.

10. The data receiver circuit of claim 1, wherein the received clock signal is in a differential mode.

11. The data receiver circuit of claim 1, additionally comprising one or more receiver isolation buffers coupled to the interface, to isolate the received clock and data signals from the one or more transmission lines.

12. The data receiver circuit of claim 1, additionally comprising a Quality of Signal (QOS) evaluation block coupled to the sampling circuit and to the clock extraction circuit, to measure voltage and timing margins for the received data signal.

13. The data receiver circuit of claim 12, the QOS evaluation block to provide instructions to a transmitter to be coupled to the one or more transmission lines to adjust drive strengths of a data driver and a clock driver.

14. The data receiver circuit of claim 12, wherein the QOS evaluation block comprises:
a digital-to-analog converter (DAC) to provide a variable voltage offset to the received data signal;
a second sampling circuit to sample the offset data signal;
a variable delay circuit, coupled to the clock extraction circuit and to the sampling circuit and having a variable timing delay, to generate a delayed clock signal, wherein the sampling circuit is synchronized to the delayed clock signal;
a comparator to compare outputs of the first and second sampling circuits; and
QOS logic coupled to the comparator, the variable delay circuit, and the DAC, to determine receiver voltage and timing margins.

15. A method of receiving data, comprising:
simultaneously receiving a data signal and a clock signal superimposed on the data signal, wherein the clock signal has a first frequency;
extracting the clock signal;
generating a symbol clock having a second frequency, wherein the first frequency is a multiple of the second frequency, wherein the multiple is greater than one; and
sampling the data signal, wherein the sampling is synchronized to the symbol clock.

16. A data transmission circuit, comprising:
a clock driver to obtain a clock signal having a first frequency and to drive the clock signal onto one or more transmission lines external to the data transmission circuit;
a timing circuit to obtain the clock signal and to generate a symbol clock having a second frequency, wherein the first frequency is a multiple of the second frequency, wherein the multiple is greater than one; and
a data driver synchronized to the symbol clock, to obtain a data signal and drive the data signal onto the one or more transmission lines at a symbol rate corresponding to the second frequency;
wherein the data signal and the clock signal are to be driven onto the one or more transmission lines simultaneously.

17. The data transmission circuit of claim 16, wherein the first frequency is an integer multiple of the second frequency, wherein the integer is greater than one.

18. The data transmission circuit of claim 16, wherein the data driver is to drive the data signal in a differential mode.

19. The data transmission circuit of claim 16, wherein the data driver is to drive the data signal in a non-return-to-zero (NRZ) format.

20. The data transmission circuit of claim 16, wherein the clock driver is to drive the clock signal in a differential mode.

21. The data transmission circuit of claim 16, wherein the clock driver and the data driver have programmable drive strengths.

22. The data transmission circuit of claim 21, wherein a combined output swing of the data driver and clock driver is substantially constant.

23. The data transmission circuit of claim 16, additionally comprising a data retimer to receive the symbol clock and provide the data signal to the data driver at a symbol rate corresponding to the second frequency.

24. The data transmission circuit of claim 23, wherein:
the clock signal has a phase; and
the timing circuit comprises a phase adjuster coupled to an input of a clock divider, the phase adjuster to adjust the phase of the clock signal.

25. The data transmission circuit of claim 23, wherein:
the clock signal has a phase; and
the timing circuit comprises a phase adjuster coupled to an output of a clock divider, the phase adjuster to adjust the phase of the symbol clock.

26. A method of transmitting data, comprising:
obtaining a clock signal having a first frequency;
driving the clock signal onto one or more transmission lines;
generating a symbol clock having a second frequency, wherein the first frequency is a multiple of the second frequency, wherein the multiple is greater than one;
obtaining a data signal; and
driving the data signal onto the one or more transmission lines at a symbol rate corresponding to the second frequency;
wherein the data signal and the clock signal are driven onto the one or more transmission lines simultaneously.

* * * * *